United States Patent [19]

Oteki et al.

[11] Patent Number: 5,485,548
[45] Date of Patent: Jan. 16, 1996

[54] SIGNAL PROCESSING APPARATUS USING A HIERARCHICAL NEURAL NETWORK

[75] Inventors: Sugitaka Oteki, Ikeda; Atsuo Hashimoto, Nishinomiya, both of Japan

[73] Assignee: Ricoh Company, Ltd., Tokyo, Japan

[21] Appl. No.: 99,719

[22] Filed: Jul. 29, 1993

[30] Foreign Application Priority Data

Aug. 1, 1992 [JP] Japan ................................. 4-225034

[51] Int. Cl.$^6$ ................................................. G06F 15/18
[52] U.S. Cl. ................................ 395/27; 395/24; 395/23
[58] Field of Search ................................. 395/23, 24, 27

[56] References Cited

U.S. PATENT DOCUMENTS

| | | | |
|---|---|---|---|
| 4,518,866 | 5/1985 | Clymer | 395/27 |
| 4,737,929 | 4/1988 | Denker | 395/27 |
| 4,918,618 | 4/1990 | Tomlinson | 395/23 |
| 5,119,468 | 6/1992 | Owens | 395/22 |

OTHER PUBLICATIONS

A Neural Net Embedded Processor with a Dynamically Reconfigurable Pipeline Architecture, T. Satonaka, IEEE/ 4–6 Jun. 1992.
A Digital "Snake" Implementation of the Back–Propagation Neural Net F. Piazza IEEE/8–11 May 1989.
A Comparison of Processor Topologies for a Fast Trainable Neural Net for Speech Recognition. Y. Suzukie, IEEE 23–26 May 1989.

Primary Examiner—Allen R. MacDonald
Assistant Examiner—Richemond Dorvil
Attorney, Agent, or Firm—Cooper & Dunham

[57] ABSTRACT

In a neural network configured of neuron model cells, each neuron model cell is adapted to hold an input signal when a forward process is performed and to hold an error signal inputted when a learning process is performed. The signal processing apparatus is arranged to execute the forward process and the learning process in parallel.

5 Claims, 41 Drawing Sheets

Output Result

Teacher Signal

[Expression 14]
Error Signal⁺

$\delta^+ \equiv \overline{y} \cap d$

[Expression 15]
Error Signal⁻

$\delta^- \equiv y \cap \overline{d}$

Original Signal

[Expression 22]
For η = 1/4
(Every fourth pulse is left in the pulse train)

[Expression 23]
For η = 1/2
(Every other pulse is left in the pulse train)

[Expression 24]
For η = 1
(No change is done in the original pulse train)

T+

ΔT+

ΔT−

NeW_T+

T−

ΔT+

ΔT−

New T−

SIGNAL PROCESSING APPARATUS USING A HIERARCHICAL NEURAL NETWORK

BACKGROUND OF THE INVENTION

1. Field of the Invention

The present invention relates to a signal processing apparatus such as a neural computer for modeling a neural network applied to character or graphics recognition, motion control such as a robot, and associative storage.

2. Description of the Invention

A so-called neural network is configured to have "neuron model cells" (neuron units) each of which models a function of a neuron serving as a fundamental unit for processing information of an organic body and is intended to process two or more pieces of information in parallel. Of information processings such as character recognition, associative storage, and motion control an organic body has a capability of simply achieving, a conventional Neumann type computer has difficulty in achieving many of such information processings.

To achieve those information processings, a great remark has been placed on the study about a model of a neural system of an organic body, in particular, a function peculiar to the organic body, that is, parallel processing or self-learning, in the field of computer simulation.

FIG. 1 is a model view showing one neuron model. This neuron model consists of a part for receiving an input from another neuron, a part for converting the input based on the predetermined rules, and a part for outputting the converted result. At the coupled portion with another neuron, there is put a variable weight "Tij" referred to as a coupling coefficient. The weight stands for a strength of the coupling. Learning means change of the weight value, on which the structure of the network is changed.

FIG. 2 is a model view illustrating a hierarchical network configured of several neural models shown in FIG. 1. This network consists of an input layer A1, a middle layer A2 and an output layer A3. One neuron is coupled with many neurons. In each layer, however, no neurons included therein are coupled with one another. Further, no coupling is provided from the output layer A3 to the input layer A2.

FIG. 2 shows a three-layered network having just one middle layer. In actual, a multilayered network may have two or more middle layers.

Considering a forward process executed in the network shown in FIG. 2. A signal inputted to the input layer A1 is propagated to the middle layer which the forward process is executed. The processed result of the middle layer is propagated the output layer in which the forward process executed. Then, the output layer feeds the final output of the neural network.

The degree of a coupling between neurons, that is, how strongly the neurons are coupled is represented by a coupling coefficient. In general, the degree of a coupling between the i-th neuron and the j-th neuron is represented by Tij. The coupling may be separated into two types. One type is a stimulant coupling in which as a neuron receives a larger signal, the neuron feeds a larger output. The other type is a suppress ire coupling in which as a neuron receives a larger signal, the neuron feeds a smaller output. Tij>0 means the stimulant coupling and Tij<0 means the suppressive coupling.

Assuming that the subject neuron is an i-th neuron and the j-th neuron feeds an output yj, the input to the subject neuron is Tij·yj in which Tij denotes the coupling coefficient between the i-th neuron and the j-th neuron(Refer to FIG. 1). Since each neuron is coupled to a lot of neurons, the sum of Tij yj for those coupled neurons, ΣTij·yj, means an input to the subject neuron. This is referred to as an internal potential, which is represented by the following expression 1

Expression 1

$$ui = \Sigma Tij \cdot yi$$

Next, the nonlinear processing is carried out about this input, and the processed input is used as an output for the subject neuron unit. The nonlinear function used herein is referred to as a neuron response function. For example, a sigmoid function f(ui) is used as indicated in the following expression 2 and FIG. 3.

Expression 2

$$f(ui) = 1/(1+e^{-1})$$

From the above expressions, the yi-degree output of the neuron i is indicated in the expression 3.

Expression 3

$$yi = fi(ui) = fi(\Sigma Tij \cdot yi)$$

Later, as a learning process, a general back-propagation algorithm (abbreviated as BP algorithm) will be briefly discussed.

In the learning process, given a certain input pattern p, the coupling coefficient is varied as the error between an actual output vale and a desired output value is made smaller. The BP algorithm is an algorithm for deriving this variation.

When a certain input pattern P is given, a difference between the actual output value (ypi) of a neural unit i and a desired output (tpi) is defined as indicated in the expression 4.

Expression 4

$$Ep = (tpi - ypi)^2 / 2$$

This stands for an error of the output layer unit i. tpi denotes teacher data given by a user. In the learning process, the degrees of all the couplings are changed in a manner to reduce this error. In actual, the variation of the coupling coefficient Tij when a pattern p is given is changed according no the following expression 5. By using the expression 4, the resulting expression becomes the expression 6.

Expression 5

$$\Delta pTij \propto -\partial E / \neq tij$$

Expression 6

$$\Delta pTij = \eta \delta piypj$$

ypj denotes an input value from the unit j to
unit i. The error dpi is variable depending on
the unit i is the output layer A3 or the middle layer A2. The error signal dpi in the output layer A3 is represented by the expression 7 and the error signal dpi in the middle layer A2 is represented by the expression 8. In these expression 7 and 8, fi' (ui) is a result of differentiating fi(ui).

Expression 7

$$\delta pi = (tpi - ypi) \cdot fi'(ui)$$

Expression 8

$$\delta pt = fi'(ui) \cdot \Sigma \delta pkTki$$

Based on the above-mentioned expressions, the general formulation of ΔTij is the following expression 9, from which the expression 10 is derived.
Expression 9

$$\Delta Tij(n+1) = \eta \Delta p_i y_{pj} + \alpha \Delta Tij(n)$$

Expression 10

$$Tij(n+1) = Tij(n) + \Delta Tij(n+1)$$

The first term in the right side of the expression 9 is a variation ΔT of the coupling coefficient derived by the expression 6. The second term is added to reduce the vibration of the error and speed up the convergence.

As described above, the calculation of the variation ΔDT of the coupling coefficient is started from the unit of the output layer A3 to the unit of the middle layer A2. It means that the learning is progressed conversely, that is, back propagated. Hence, the learning based on the back propagation is processed by repeating a forward process of inputting learning data and outputting the processed data and a back process of changing the degrees of all the couplings for reducing an error contained in the result until the convergence is completed.

FIG. 4 is a block diagram showing a general circuit for performing the forward process of one neuron based on the operation of numerical values. 2 denotes a memory for storing a coupling coefficient of a synapse and 3 denotes a multiplier. 4 denotes an area including the memory 2 and the multiplier 3. The area 4 serves as a synapse of the neuron for operating a product of an input signal and a synapse coefficient. 8 denotes a cell which includes an adder 5, a register 6, and a conversion table 7. The adder 5 serves to accumulatively add a product of a coupling coefficient calculated by the synapse and an input signal. This accumulated value is processed according to the sigmoid function contained in the conversion table 7. The processed value is output from the cell 8. This cell 8 holds true to the cell of the neuron in an organic body.

This is the content of the forward process executed in one neuron.

The conventional hierarchical neural network configures the network shown in FIG. 2. The flow of data in the forward process in the three-layered type network. As shown in FIG. 5, input signals a1 to a4 are given onto the input layer A1 and output signals b1 to b4 are given from the output layer A4.

FIG. 7 shows a multilayered neural network providing an input layer A, a plurality of middle layers B1 to Bn-1, and an output layer C. In the multilayered network, data flows from the input layer to the output layer through the middle layers in sequence.

Next, the forward process of the three-layered network will be described on a circuit diagram of FIG. 9 and a timing chart of FIG. 10. Herein, the circuit diagram of FIG. 9 indicates a circuit for configuring the three-layered network of the circuits for executing the forward process of one neuron shown in FIG. 4 and executing the forward process in the three-layered network. FIG. 10 is a timing chart showing the forward process.

At a state S1 of FIG. 10, an input signal 10 of the input layer is sent to a forward process executing circuit 11 located in the middle layer and a control circuit 15 starts to send a forward process start signal FWDS1 for the middle layer. With this start signal, the forward process is executed by the first input signal and the processed result is held in a register 12. At a next stage S2, a value held in the register 12 is inputted to a forward process executing circuit located in the output layer and the control circuit 15 operates to send a forward process start signal FWDS2 for an output layer. With this signal FWDS2, the forward process is executed in the output layer for obtaining an output 14. As described above, the sequentially given input signal 10 is forward-processed in parallel as shown in FIG. 10.

the multilayered network having a lot of middle layers, as shown in the circuit diagram of FIG. 11 and the timing chart of FIG. 12, like the foregoing three-layered network, the forward process is executed in a pipeline manner.

In addition, the learning process is basically executed in a general-purpose computer located outside.

FIG. 38 is a circuit diagram showing an implementation of the above-mentioned network on an electric circuit (see Japanese Patent Lying Open No. (KOKAI) 62-295188). Basically, this electric circuit is arranged to have a plurality of amplifiers 103 having a sigmoid transfer function and a resistive feedback circuit network 101 connecting an output of each amplifier 103 with an input of the amplifier on another layer as indicated by an alternate long and short dash line. On the input side of each amplifier 103, a CR time constant circuit 102 made of a grounded capacitor C and a grounded resistor R is connected. And, the input current I1, I2 to IN is fed to the input of each amplifier 103, the output of which can be obtained from the collection of output voltages of these amplifiers 103.

The strength of an input signal or an output signal is represented by voltage. The degree of a coupling of a neural cell is represented by resistance of a resistor 100 (lattices in the resistive feedback circuit network 101) connecting the I/O lines between the cells. The neural cell responsive coefficient is represented by the transfer function of each amplifier 103. Further, the coupling between the neural cells is separated into two types, stimulant and suppressive couplings as described above. Mathematically, it is represented by the positive or negative sign of the coupling coefficient. However, it is quite difficult to stand for the positive or negative sign by the constant on the circuit. In this circuit implementation, the output of the amplifier 103 is divided into two, one of which is reversed for generating positive and negative signals 103a and 103b. By properly selecting one of these signals, the positive or negative sign is represented. The sigmoid function as shown in FIG. 6 corresponds to the amplifier of this circuit arrangement.

FIGS. 33 to 36 are diagrams showing the neural network implemented by a digital circuit. FIG. 34 is a diagram showing a circuit arrangement of a single neural cell, in which 110 denotes a synapse circuit, 111 denotes a tree projection circuit, and 112 denotes a cell circuit. FIG. 35 shows an arrangement of the synapse circuit 110 shown in FIG. 34. A rate multiplier 110b is provided for inputting an input pulse f multiplied by a magnification a (which is a value to be multiplied by a feedback signal and is actually 1 or 2) through a coefficient circuit 110a. The rate multiplier 110 is connected to the synapse weight register 110c for storing a weight value w. Further, FIG. 36 shows an arrangement of the cell circuit 112 which is arranged to have a control circuit 113, an up/down counter 114, a rate multiplier 115, and a gate 116 connected in sequence. Further, an up/down memory 117 is provided to the cell circuit.

The I/O of the neuron unit is represented by a pulse train and the amount of the signal is represented by a pulse density. The coupling coefficient is treated by a binary digit and is held in the synapse weight register 110c. The signal processing is carried out as follows.

At first, an input signal is inputted to the rate multiplier 110b and the coupling coefficient is inputted to the rate value. With this, the pulse density of the input signal may be reduced according to a rate value. This corresponds to a part of Tijyi indicated in the expression 1 about the BP model. The part of Σ of ΣTijyi is implemented by an OR circuit indicated by the tree projection circuit 111. Since the coupling has two types, stimulant and suppressive, the couplings are pre-grouped into two types, in each of which the coupling coefficients are ORed. In FIG. 34, F1 is a stimulant output and F2 is a suppressive output.

These two outputs are inputted to the up side and the down side of the counter 114 shown in FIG. 36 and the counter 114 counts the signals. The output of the counter 114 is a binary digit. Hence, again, it is converted into a pulse density by means of the rate multiplier 115. The plurality of neuron cell units are used for configuring the neural network.

The learning function is implemented by inputting the final output of the network to the external computer, doing numeral calculations inside of the computer, and writing the calculated result in the synapse weight register 110c for holding the coupling coefficient.

The present applicants have already developed a signal processing apparatus based on the neural network configured of neuron model cells and filed an application for a patent (Japanese Patent Application No. 1-343891). This invention concerns with this signal processing apparatus as a topic of one embodiment. Later, the description will be oriented to the signal processing apparatus developed by the present applicants.

this signal processing apparatus, as an example of the neural network, a proposal has been made about a neuron unit using a digital logic circuit and signal processing of a network circuit configured of such neuron units.

The basic ideas for this proposal are:

1. The I/O signal, the middle signal, the coupling coefficient, and the teacher signal about a neuron unit are all represented by a pulse train consisting of two values of "0" and "1".

2. The value of the signal in the network is represented by a pulse density (the number of "1's" within a predetermined time)

3. The calculation inside of the neuron unit is performed by logic operations about the pulse trains.

4. The pulse train about the coupling coefficient is stored in a memory located in the neuron unit.

5. In the learning process, when an error is derived on the pulse train corresponding to a given teacher signal and the coupling coefficient is changed on this error, the calculation about the error and the variation of the coupling coefficient is performed by logic operations about a pulse train consisting of "0" and "1".

Those basic ideas will be discussed below in detail.

FIG. 13 shows how one neuron element performs the forward process in a pulse density system. The configured network is a hierarchical neuron network as shown in FIG. 2.

At first, all the inputs and outputs of the neuron network are converted into a binary data consisting of "0" and "1". An input yi and a coupling coefficient Tij represented by a pulse density are ANDed for each synapse. This corresponds to Tij·yj in the expression 1. From a view of probability, the pulse density output from this AND circuit is equal to a product of pulse densities of an input signal and a coupling coefficient.

As mentioned above, the coupling of neurons are separated into two types, that is, stimulant couplings and suppressive couplings. For operating numerical values, the sign of the coupling coefficient is set so that the plus sign is for the stimulant couplings and the minus sign for the suppressive couplings.

For the pulse density system, each coupling separated into two groups, stimulant couplings and suppressive couplings based on the sign of the coupling coefficient Tij. For each group, the coupling coefficients are ORed. This logical OR operation corresponds to the Σ process of the expression 3 and the process of the nonlinear type saturation function fi.

That is, in the operation of the pulse density, if the pulse density is low, the ORed pulse density may approximate to the sum of the pulse densities of the ORed inputs. As the pulse density is made higher, the output of an OR circuit is made gradually saturated. The output of the OR circuit does not match to the sum of the pulse densities. The relation between them is nonlinear.

For this OR operation, the value P of the pulse density is $0 \leq P \leq 1$ and has a relation of a monotonic function with the magnitude of the input. This is the same processing as that of the sigmoid function indicated the expression 2 or FIG. 3.

In the pulse density system, the neuron cell serves to output a value of "1" only if the OR output a of the stimulant group derived as above is "1" and the OR output b of the suppressive group is "0". That is, the outputs may be represented as follows.

Expression 11

$$a = U(y_i \cap T_{ij}) \quad (0 < T = \text{stimulant})$$

Expression 12

$$b = U(y_i \cap T_{ij}) \quad (0 > T = \text{suppressive})$$

Expression 13

$$y_i = g(a, b) = a \cap {}^*b$$

Later, the description will be oriented to how the learning process is performed in the pulse density system.

In the neural network where no learning process is executed, the output of the network when a pattern is inputted is not always a desirous output. Hence, like the foregoing back-propagation algorithm, the learning process is executed to change the coupling coefficient toward reduction of an error between an actual output value and a desired output value.

(Signal Error in Output Layer)

At first, the error signal in an output layer will be discussed.

If the error is represented by a numerical value, it may take both positive and negative values. The pulse density system disallows such a representation. Hence, by using two signals standing for a plus component and a minus component, respectively, the error in the output layer may be defined as follows and illustrated in FIGS. 38–41.

That is, the plus component (δ+) of the error signal is "1" only if the output result is "0" and the teacher signal is "1".

On the other hand, the minus component (δ−) of the error signal is "1" only if the output result is "1" and the teacher signal is "0".

These error signals δ+ and δ− correspond to the expression 7 for obtaining the error signal of the output layer in the foregoing back-propagation algorithm.

(Error Signal in Middle Layer)

The error signal in a middle layer is also derived by referring to the expression 8 based on the BP algorithm in the pulse density system. That the collection of the error signals in the output layer is defined as a self error signal. Herein, the coupling is divided into two groups, stimulant and suppressive coupling groups, in which the product is represented by ∩(AND) and the sum (Σ) is represented by U(OR). Further, to derive the error signal in the middle layer, tile coupling coefficient Tij has two types, and minus and the error signal δ also has two types, plus and minus. In total, the four components are used for deriving the error signal.

For the stimulant coupling, the error signal plus component δ+ and its coupling coefficient of the output layer are ANDed. The ANDed result (δ+i∩ T+ij) is derived about all the neurons in the output layer. Then, those ANDed results are ORed. The ORed result is a plus component δ+ of the error signal of the neurons in the middle layer.

Expression 16

$$\delta+ = U(\delta+i \cap T+ij)$$

Likewise, the error minus component δ− and its coupling coefficient are ANDed. The ANDed result (δ−i∩Tij) is derived about all the neurons in the output layer. Then, those ANDed results are ORed. The ORed result is a minus component δ− of the error signal of the neurons in the middle layer.

Expression 17

$$\delta- = U(\delta-i \cap T+ij)$$

Next, the description will be oriented to the suppressive coupling. The minus component δ− and its coupling coefficient in the output layer are ANDed. The ANDed result (δ−i∩T−ij) is derived about all the neurons in the output layers. Then, those ANDed results are ORed. The ORed result is a plus component of the error signal of the neurons in the middle layer.

Expression 18

$$\delta+ = U(\delta-i \cap T-ij)$$

Likewise, the error signal plus component and its coupling coefficient in the output layer are ANDed. The ANDed result (δ+i∩T−ij) is derived about all the neurons in the output layer. Those ANDed results are ORed. The ORed result is a minus component of the error signal of the neurons in the middle layer.

Expression 19

$$\delta- = U(\delta+i \cap T-ij)$$

The coupling between a neuron in the middle layer and a neuron in the output layer is stimulant or suppressive. As for the plus component of the error signal in the middle layer, the stimulant coupling δ+ indicated in the expression 16 and the suppressive coupling δ+ indicated in the expression 18 are ORed. Likewise, as for the minus component of the error signal in the middle layer, the stimulant coupling δ− indicated in the expression 17 and the suppressive coupling δ− indicated in the expression 19 are ORed. That is, the ORed results are the following expressions 20 and 21, which correspond to the expression 8 in the BP algorithm.

Expression 20

$$\delta+ = \{U(\delta+i \cap T+ij)\} U \{U(\delta-i \cap T-ij)\}$$

Expression 21

$$\delta- = \{U(\delta-i \cap T+ij)\} U \{U(\delta+i \cap T-ij)\}$$

(Processing of a learning constant η

The description will be oriented to the processing of a learning constant η indicated in the expression 6 for deriving a modification ?T of the coupling coefficient in the BP algorithm and is seen in FIGS. 42–45. For the numerical operation, as indicated in the expression 6, the learning constant η is simply multiplied with a multiplicand. For the pulse density system, according to the value of the learning constant η, the pulses are thinned out from the pulse train as indicated below.

Next, the description will be oriented to a method for deriving a modification ?T about the coupling coefficient in the learning process.

At first, the processing of the learning constant h is performed about the error signals (δ+, δ−) in the output layer or the middle layer. Then, the result is ANDed with an input signal to the neuron (δ∩y). Since the error signal has two types of δ+ and δ−, the operations indicated in the expressions 25 and 26 are performed about these error signals for deriving T+ and T−. These expressions correspond to the expression 6 for deriving ?T in the BP algorithm.

Expression 25

$$\Delta T+ = \delta+ \cap y$$

Expression 26

$$\Delta T- = \delta- \cap y$$

Based on these modifications T+ and T−, the net coupling coefficient New Tij is derived. In this case, the coupling coefficient Tij has to be separated into stimulant and suppressive.

For the stimulant coupling coefficient, the component of ΔT+ is reduced as compared with the original T+ as seen in FIG. 46.

Expression 27

$$New\_Tij+ = Tij+U\Delta T+ \cap \Delta^* T-$$

Next, for the suppressive coupling coefficient, the component of ΔT+ is reduced as compared with the original T− so that the component of ΔT− may be increased as seen in FIG. 47.

Expression 28

$$New\_Tij- = Tij-U\Delta T- \cap^* \Delta T+$$

This is a learning algorithm in the pulse density system.

In the hierarchical network shown in FIG. 2, the executing flows of the forward process and the learning process in the pulse density system will be described briefly.

At first, in the forward process, when an input signal is given to the input layer, this input signal is propagated through the middle layer. As the signal processing for the middle layer, the foregoing expressions 11 to 18 are performed. The processed result is propagated to the output layer.

In the output layer, these propagated signals are processed according to the expressions 11 to 13. The process result is made to be an output signal. Then, the forward process is terminated.

In the learning process, after executing the forward process, a teacher signal is given to the output layer. In the output layer, an error signal is derived by the expressions 14 and 19 and then is sent to the middle layer. At a time, the processing of the learning constant η is executed about this error signal according to the expressions 22 to 24. The processed result is ANDed with an input signal from the middle layer according to the expressions 25 and 26. Then, the coupling degree between the output layer and the middle layer is changed according to the expressions 27 and 28.

Next, in the middle layer, based on the error signal sent from the output layer, an error is derived according to the expressions 20 and 21. About this error signal, the learning processing of the expressions 22 to 24 is done with the constant h. The coupling degree between the middle layer and the input layer is changed according to the expressions 25 and 26. Then, the learning process is terminated.

This learning process is repeated until the convergence is completed.

Next, with reference to FIGS. 14 to 16, the actual circuit arrangement based on the above-mentioned algorithm will be described. The configuration of the neural network used therein is the same as that shown in FIG. 2. FIG. 14 is a circuit diagram showing a part corresponding to a synapse of a neuron. FIG. 15 is a circuit diagram showing a part corresponding a neuron cell itself. FIG. 16 is a circuit diagram showing a part for deriving an error signal in the output layer from the output of the output layer and the teacher signal. The inclusion of these three circuits in the network as shown in FIG. 2 makes it possible to implement a digital neural network for doing self learning.

At first, the description will be oriented to the arrangement shown in FIG. 14. 20 denotes an input signal to the neuron unit. The coupling coefficient of the synapse is stored in a shift register 27. At a terminal 27A, data is picked out. At a terminal 27B, data is inputted. In place of the shift register, it is possible to use another component having the same function, for example, a combination of a RAM and an address controller.

The circuit 28 is a circuit for executing (yi∩ Tij) in the expression 12. It serves to AND the input signal with the coupling coefficient. The ANDed output has to be separated into two groups according to the stimulant and the suppressive couplings. It is more available to prepare the outputs 23 and 24 to their groups and select the proper output for the object coupling type. Hence, a bit representing if the coupling is stimulant or suppressive is stored in a memory 33. A switching gate circuit 32 serves to switch the signal based on the bit.

Further, as shown in FIG. 15, a gate circuit 34 is provided to have a plurality of OR gates, which correspond to a logical OR executed in the expressions 11 and 12 for processing each input. Also as shown in FIG. 15, another gate circuit 35 is provided to have an AND gate and an inverter. This gate circuit 35 serves to give an output only if the stimulant group as indicated in the expression 13 is "1" and the suppressive group is "0".

Next, the error signal will be described. FIG. 14 is a circuit diagram showing a circuit for generating an error signal in the output layer. This circuit is a logic circuit having a combination of an AND and an inverter, which corresponds to the expressions 14 and 15. That is, the output 38 from the output layer and the teacher signal 39 are used for generating error signals 40 and 41. The expressions 16 to 19 for deriving the error signals in the middle layer are carried out in the gate circuit 29 consisting of AND gates as indicated in FIG. 14. The gate circuit 29 serves to give outputs 21 and 22 according to a plus or a minus sign of the coupling.

As mentioned above, the error signal is defined on whether or not the coupling is stimulant or suppressive. The separation is required to be done. This separation is performed by a gate circuit 31 consisting of AND and OR gates according to the information indicating if the coupling is stimulant or suppressive, stored the memory 33 and the error signals + and − 25 and 26. Further, the expressions 20 and 21 for collecting the error signals are performed in the gate circuit 36 consisting of OR gates shown in FIG. 15. The expressions 22 to 24 corresponding to the learning rate are executed in a frequency dividing circuit 37 shown in FIG. 15.

At last, the description will be oriented to a part for computing a new coupling coefficient from the error signal. This is represented by the expressions 25 to 28, which are performed by a gate circuit 30 consisting of AND gates, inverters and OR gates. This gate circuit 30 has to be separated depending on if the coupling is stimulant or suppressive. This separation is performed by the gate circuit 31 shown in FIG. 14.

The aforementioned hierarchical neural network has a configuration as shown in FIG. 2. Now, consider a forward process, as shown in FIG. 5, for giving an input signal to the input layer (layer A1 in the left hand of FIG. 5) and obtaining an output signal from the output layer (layer A3 in the right hand of FIG. 5) and a learning process, as shown in FIG. 6, for giving an input signal to the input layer, giving a teacher signal to the output layer in that state, changing a coupling coefficient between the output layer and the middle layer, and further changing a coupling coefficient between the middle layer and the input layer.

At first, in the forward process, when the input signal is given to the input layer, this input signal is propagated through the middle layer. The middle layer performs the operations indicated in the expressions 1 and 2 as signal processing and propagates the processed result to the output layer. The output layer also performs the operations indicated in the expressions 1 and 2 with respect to the propagated signal and feeds the processed result as its output signal.

In the learning process, after finishing the forward process, the teacher signal is given to the output layer. The output layer serves to derive an error by operating the expression 5 and propagate this error through the middle layer and change the degree of coupling between a neuron unit of the output layer and that of the middle layer, that is, a coupling coefficient based on the expressions 9 and 10.

Next, the middle layer serves to derive an error in this layer based on the expression 7. Based on the derived error, the middle layer changes a degree of coupling (coupling coefficient) between a neuron unit in the middle layer and that in the input layer based on the expressions 9 and 10. This is the end of the learning process.

The forward process and the learning process needs complicated processing and a vast amount of numerical operations as described above, which takes a considerably long time. In particular, the learning process has a larger amount of data to be processed than the forward process. Further, the learning process needs not a single learning operation but hundreds or thousands of learning operations. Hence, the operating time required therefor is so long that a dedicated hardware for this operation may not give a sufficient operating capability to the actual operation in the learning process.

The hierarchical neural network model may take a three-layered configuration as shown in FIGS. 5 and 6 as well as a various number of middle layers as shown in FIGS. 7 and 8. The larger number of layers takes a longer time in doing the forward process and the learning process.

FIG. 37 shows a flow of a conventional signal the three-layered neural network as shown in FIG. 2.

In FIG. 87, the FWD circuits 4 and 5 are circuits for executing the forward process in the middle layer A2 and that in the output layer A3 in FIG. 2, which circuits correspond to 28, 32 in FIG. 14 and 34, 35 in FIG. 15, respectively.

The learning circuits LRN 6 and 7 are circuits for executing the learning process in the middle layer A2 and that is the output layer A3 as shown in FIG. 2, which circuits correspond to 29, 30, 31 as shown in FIG. 14 and 36, 37 as shown in FIG. 15, respectively. The error generating circuit ERR 8 serves to derive an error signal in the output layer, which corresponds to the circuit shown in FIG. 16.

As referring to FIG. 37, one learning process will be described. At first, when an input signal 1 is given to the input signal, this signal is propagated through the middle layer. The FWD circuit 4 in the middle layer serves to execute the forward process in the middle layer.

Next, the processed result in the FWD circuit 4 is propagated to the FWD circuit 5 in the output layer, in which circuit the forward process in the output layer is executed. This is the completion of the forward process. In the learning process, a teacher signal 3 is further given to the output layer. Based on the teacher signal 3, the error generating circuit 8 serves to generate an error signal in the output layer. The error signal is propagated to the learning circuit LRN 7. Based on the error signal of the output layer and the input signal to the FWD circuit 5, the learning process in the output layer is executed. The generated error signal in the middle layer is propagated to the learning circuit LRN 6 in the middle layer. Based on the error signal in the middle layer and the input signal to the FWD circuit 4, the learning process in the middle layer is executed. This is the completion of the learning process.

As set forth above, in particular, in the learning process, the processing path is so long that provision of the dedicated circuit for speeding up the process may not enhance its processing speed sufficiently. This is a disadvantage. Further, as shown in FIGS. 7 and 8, more middle layers need more processing time. This is another disadvantage.

It is an object of the present invention to provide a signal processing apparatus in a hardwared neural network which enhances its processing speed.

SUMMARY OF THE INVENTION

A signal processing apparatus according to a first aspect of the invention is characterized in that a signal processing apparatus using a neural network composed of neuron model cells, wherein said neuron model cells have means for holding an input signal to be given in a forward process, and means for holding an error signal to be given in a learning process, and said forward processing and said leaning processing are executed in parallel to each other.

A signal processing apparatus according to a second aspect of the invention is characterized in a signal processing apparatus using a hierarchical neural network composed of neuron model cells, wherein a forward process of said neural network composed of an input layer, a middle layer and an output layer is divided into some small processes, and each of said divided processes is executed in a pipeline manner.

A signal processing apparatus according to a third aspect of the invention is characterized in that a signal processing apparatus using a hierarchical neural network composed of neuron model cells, wherein a forward process and a leaning processing of said neural network composed of an input layer, a middle layer and an output layer are divided into some small processes, and each of said divided processes is executed in a pipeline manner.

A signal processing apparatus according to a fourth aspect of the invention is characterized in that a signal processing apparatus using a hierarchical neural network composed of neuron model cells, comprising counters provided for an input layer, a middle layer and an output layer respectively for setting initial values, and means for ensuring said counters for layers to set said initial values before transferring to a forward process and giving a forward process execution signal common to all of said counters when executing said forward process, said counter for each layer serving to count said forward process execution signal and generate a forward process execution signal having a predetermined value for executing said forward process of each layer.

A signal processing apparatus according to a fifth aspect of the invention is characterized in that a signal processing apparatus using a hierarchical neural network composed of neuron model cells, comprising counters provided for an input layer, a middle layer and an output layer, respectively, registers for storing start states of forward processes for said layers, comparators each for comparing a value of one of said counters with a value of said corresponding one of said registers, means for activating said register to store a state for starting a forward process of the corresponding layer before transferring to said forward process and giving a forward process execution signal common to each layer when executing said forward process, wherein said counter for each layer serves to count in response to said forward process execution signal, said comparator for each layer serves to generate a forward process execution signal for ordering each layer to execute said forward process when the value of said counter for each layer is equal to or more than the value of the register.

A signal processing apparatus according to a sixth aspect of the invention is characterized in that a signal processing apparatus using a hierarchical neural network composed of neuron model cells, comprising counters provided for an input layer, a middle layer and an output layer respectively for setting initial values, and means for ensuring said counters for layers to set said initial values before transferring to a leaning process and giving a leaning process execution signal common to all of said counters when executing said leaning process, said counter for each layer serving to count said leaning process execution signal and generate a leaning process execution signal having a predetermined value for executing said leaning process of each layer.

A signal processing apparatus according to a seventh aspect of the invention is characterized that a signal processing apparatus using a hierarchical neural network composed of neuron model cells, comprising means for executing a learning process having counters for all of an input layer, a middle layer and an output layer, registers for storing a learning process start state, comparators for comparing a value of one of said counters with a value of the corresponding one of said registers, and means for activating said register in each layer to store a state for starting the learning process of the layer and giving a learning process execution signal common to each layer when executing the learning process, wherein said counter of each layer serves to count in response to said learning process execution signal, and said comparator of each layer serves to generate a learning process execution signal to be given if the value of said counter for one of said layers is equal to or more than the value of said registers for one of said layers.

A signal processing apparatus according to a eighth aspect of the invention characterized in that a signal processing apparatus using a hierarchical neural network composed of neuron model cells, comprising the forward process executing means as claimed in claim 4 or 5, and the learning process execution means as claimed in claim 6 or 7 for executing the learning process independently of the execution of said forward process.

A signal processing apparatus according to a ninth aspect of the invention is characterized in that a signal processing apparatus using a hierarchical neural network composed of neuron model cells, comprising process counters provided for an input layer, a middle layer and an output layer respectively for controlling a forward process and a learning process, forward-process registers for storing forward process start states, forward process comparators for comparing values of said registers with values of said process counters for the respective layers, learning process registers for storing learning process start states of said layers, learning process comparators for comparing values of said learning-process registers with values of said process counters for the respective layers, and means for activating said register for storing the forward process start state of each layer to store a state for starting the learning process of each of said layers and giving a process execution signal common to all of the layers when executing said process, wherein each of said process counters serves to count said process counter, each of said forward process comparators serves to generate a forward process execution signal for starting the forward process when the value of the corresponding process counter is equal to or more than the corresponding register for storing a forward process start state, and said learning process register serves to generate a learning process execution signal for starting the learning process when the value of the corresponding process counter is equal to or more than the value of the corresponding register for storing the learning process start state.

The signal processing apparatus according to the first aspect of the invention is arranged to have the means for holding an input signal inputted when doing the forward process and an error signal inputted when doing the leaning process. With this means, this apparatus operates to execute the forward process and the leaning process in parallel. The parallel execution of these processes may enhance the processing speed higher than the serial execution of those processes.

The signal processing apparatus according to the second aspect of the invention is arranged to subdivide the forward process to be executed in the neural network composed of the input layer, the middle layer and the output layer and execute the sub processes in parallel. This parallel processing is faster than the serial processing of the forward process. In the configuration having not a single but more middle layers, the serial processing needs more processing time according to the number of the middle layers. However, according to this invention, the parallel processing just needs the processing time for one middle layer. This invention implements the high-speed processing.

The signal processing apparatus according to the third aspect of the invention is arranged to subdivide the forward process and the learning process to be executed in the neural network composed of the input layer, the middle layer and the output layer and execute the sub processes in parallel. This parallel processing is faster than the serial processing of the forward and the learning processes. In the configuration having not a single but more middle layers, the serial processing needs more processing time according to the number of the middle layers. However, according to this invention, the parallel processing just needs the processing time for one middle layer. This invention implements the high-speed processing.

The signal processing apparatus according to the fourth or fifth aspect of the invention is arranged to set an initial value to the counter for each layer before transferring to the forward process independently of the number of layers included in the neural network and to give one control signal, that is, a common forward process execution signal for generating a forward process execution signal for each layer on its own timing. The forward process in each layer may be started on its solid timing.

In the signal processing apparatus according to the fourth aspect of the invention, the control block for controlling the overall network does not need to generate the starting signal for the forward process in each layer. Independently of the number of layers in the network, therefore, it is possible to simplify the control circuit and reduce the scale of it.

Only one control line is needed for the forward process start signal for each layer. Hence, the number of wires in the network may be reduced. This results in lowering the possibility of noise propagation and erroneous operation due to a skew, thereby enhancing the reliability of the overall network circuit.

Further, in a case that the circuit is printed on the substrate, since the control signal is sharable in the layers, the change of the number of the layers composing the neural network is easily implemented.

In the signal processing apparatus according to the fifth aspect of the invention, the control block for controlling the overall network does not need to generate the starting signal for the forward process in each layer. Independently of the number of layers in the network, therefore, it is possible to simplify the control circuit and reduce the scale of it.

Only one control line is needed for the forward process start signal for each layer. Hence, the number of wires in the network may be reduced. This results in lowering the possibility of noise propagation and erroneous operation due to a skew, thereby enhancing the reliability of the overall network circuit.

Further, in a case that the circuit is printed on the substrate, since the control signal is sharable in the layers, the change of the number of the layers composing the neural network is easily implemented.

The signal processing apparatus according to the sixth or seventh aspect of the invention is arranged to set an initial value to the counter for each layer before transferring to the learning process independently of the number of layers included in the neural network and to give one control signal, that is, a common learning process execution signal for generating a learning process execution signal for each layer on its own timing. The learning process in each layer may be started on its solid timing.

In the signal processing apparatus according to the sixth aspect of the invention, the control block for controlling the overall network does not need to generate the starting signal for the learning process in each layer. Independently of the number of layers in the network, therefore, it is possible to simplify the control circuit and reduce the scale of it.

Only one control line is needed for the learning process start signal for each layer. Hence, the number of wires in the network may be reduced. This results in lowering the possibility of noise propagation and erroneous operation due to a skew, thereby enhancing the reliability of the overall network circuit.

Further, in a case that the circuit is printed on the substrate, since the control signal is sharable in the layers, the change of the number of the layers composing the neural network is easily implemented.

In the signal processing apparatus according to the seventh aspect of the invention, the control block for controlling the overall network does not need to generate the starting signal for the learning process in each layer. Independently of the number of layers in the network, therefore, it is possible to simplify the control circuit and reduce the scale of it.

Only one control line is needed for the learning process start signal for each layer. Hence, the number of wires in the network may be reduced. This results in lowering the possibility of noise propagation and erroneous operation due to a skew, thereby enhancing the reliability of the overall network circuit.

Further, in a case that the circuit is printed on the substrate, since the control signal is sharable in the layers, the change of the number of the layers composing the neural network is easily implemented.

The signal processing apparatus according to the eighth aspect of the invention is arranged to set an initial value to the counter for each layer before transferring to the forward process independently of the number of layers included in the neural network and to give one control signal, that is, a command forward process execution signal for generating a forward process execution signal for each layer on its own timing. The learning process in each layer may be started on its solid timing. Further, the signal processing apparatus is arranged to set an initial value to the counter for each layer before transferring to the learning process and to give one control signal, that is, a common learning process execution signal for generating a learning process execution signal for each layer on its own timing. The learning process in each layer may be started on its solid timing.

In the signal processing apparatus according -to the eighth aspect of the invention, the control block for controlling the overall network does not need to generate the starting signal for the forward process and the learning process in each layer. Independently of the number of layers in the network, therefore, it is possible to simplify the control circuit and reduce the scale of it.

Only one control line is needed for the forward process and the learning process start signal for each layer. Hence, the number of wires in the network may be reduced. This results in lowering the possibility of noise propagation and erroneous operation due to a skew, thereby enhancing the reliability of the overall network circuit.

Further, in a case that the circuit is printed on the substrate, since the control signal is sharable in the layers, the change of the number of the layers composing the neural network is easily implemented.

In addition, the forward process circuit or the learning process circuit may be located in any layer only if the initial values are set to these circuits. Hence, no restriction for the circuits makes this apparatus more controllable.

The signal processing apparatus according to the ninth aspect of the invention is arranged to set each initial value to the process counter, the register for the forward process, and the register for the learning process provided in each layer before transferring to the forward process independently of the number of layers included in the neural network and to give one control signal, that is, a common process execution signal in order that the forward process in each layer may be started on its solid timing and the learning process in each layer may be also started on its solid timing.

In the signal processing apparatus according to the ninth aspect of the invention, the control block for controlling the overall network does not need to generate the starting signal for the forward process and the learning process in each layer. Independently of the number of layers in the network, therefore, it is possible to simplify the control circuit and reduce the scale of it.

Only one control line is needed for the forward process and the learning process start signal for each layer. Hence, the number of wires the network may be reduced. This results in lowering the possibility of noise propagation and erroneous operation due to a skew, thereby enhancing the reliability of the overall network circuit.

Further, in a case that the circuit is printed on the substrate, since the control signal is sharable in the layers, the change of the number of the layers composing the neural network is easily implemented.

In addition, the forward process circuit or the learning process circuit may be located in any layer only if the initial values are set to these circuits. Hence, no restriction for the circuits makes this apparatus more controllable.

Further objects and advantages of the present invention will be apparent from the following description of the preferred embodiments of the invention as illustrated in the accompanying drawings.

DESCRIPTION OF THE PREFERRED EMBODIMENTS

Hereafter, the description will be oriented to an implementation of the above-mentioned neural network composed of digital circuits to which this invention applies.

Figure 2:
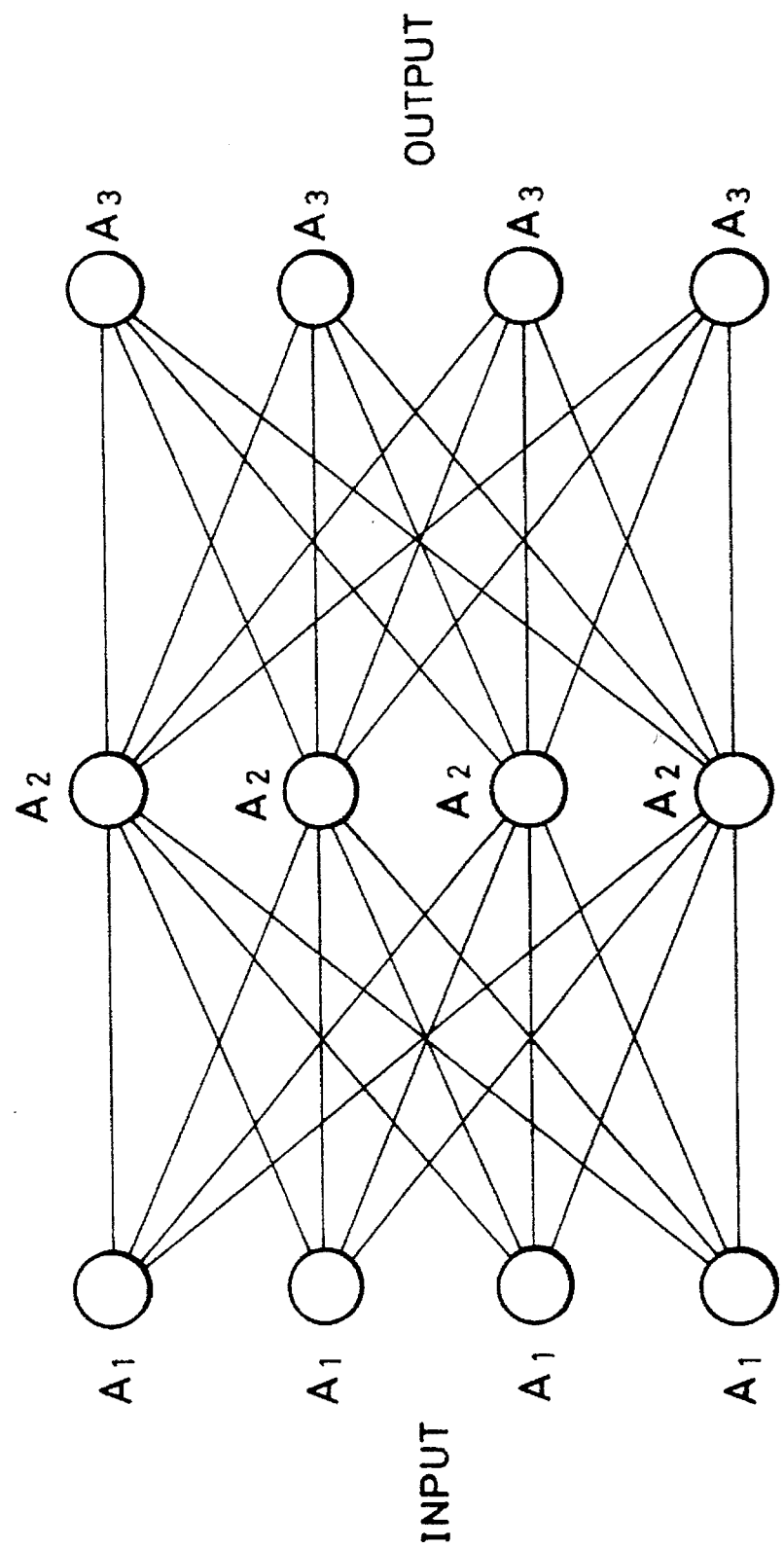
FIG. 2 is a model view showing a plurality of neuron units shown in FIG. 1 configured in a network.
Figure 3:
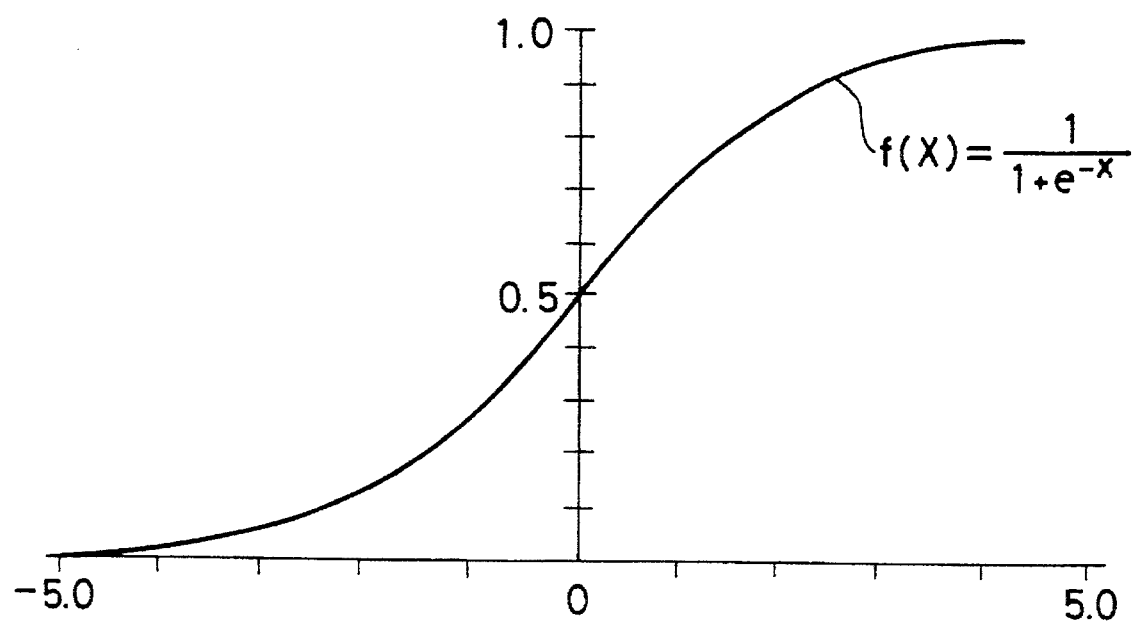
FIG. 3 is a graph showing a sigmoid function.
Figure 4:
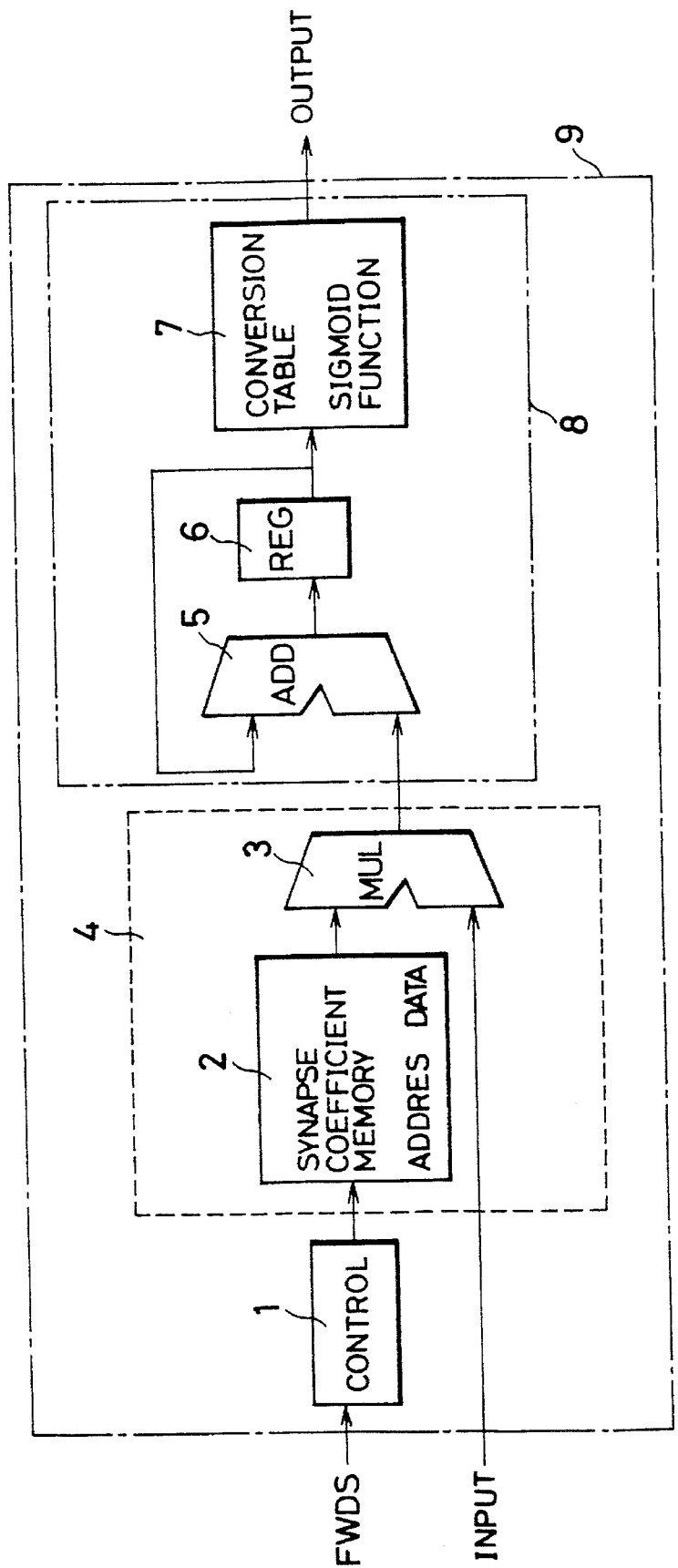
FIG. 4 is a block diagram showing a typical circuit for performing a numerical operation about a forward process of one neuron.
Figure 5:
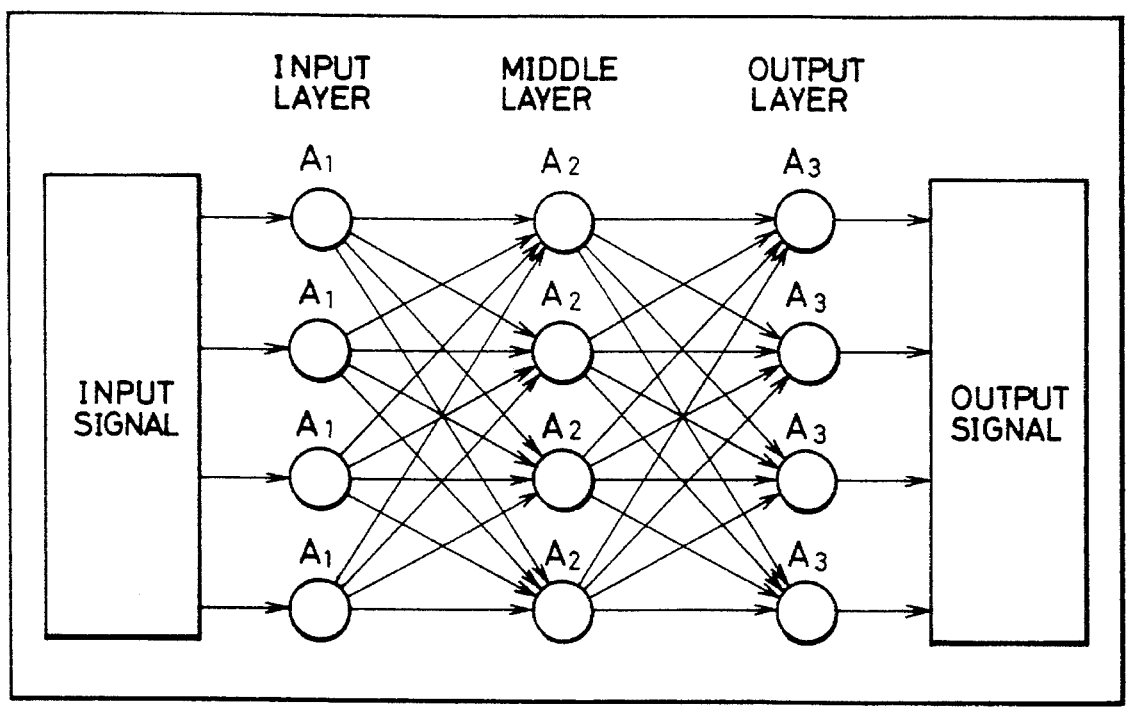
FIG. 5 is an explanatory view showing a forward process to be executed in a three-layered hierarchical network.
Figure 6:
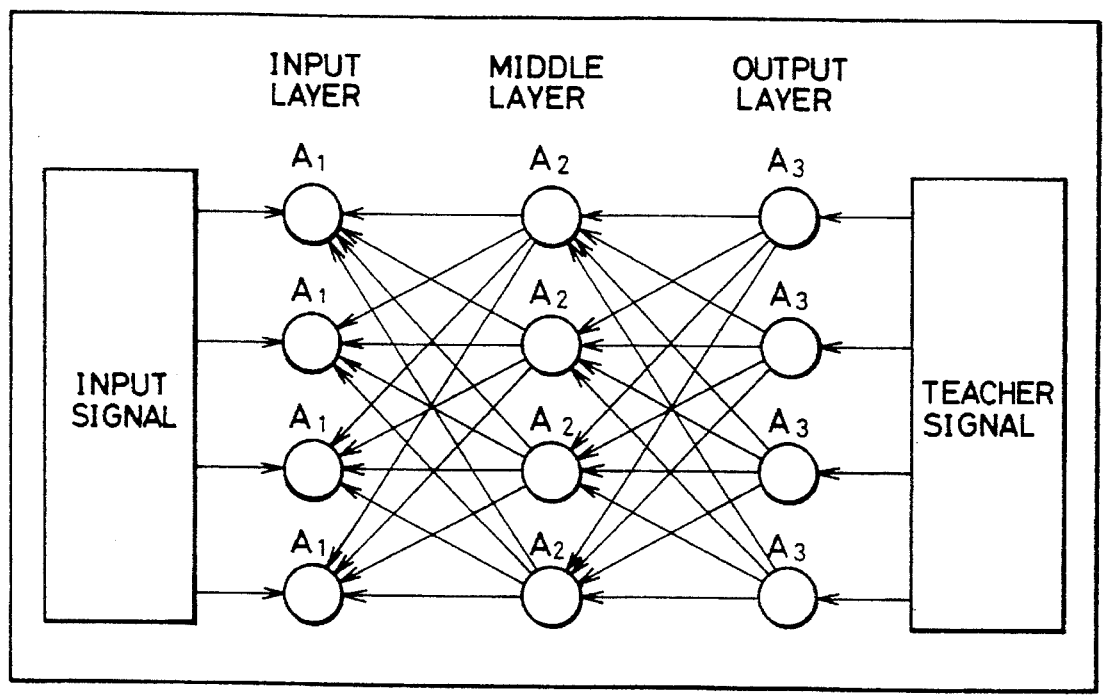
FIG. 6 is an explanatory view showing a learning process to be executed in a three-layered hierarchical network.

As mentioned above, even the dedicated hardware for the neural network as shown in FIG. 2 does not provide a sufficient processing speed for executing the forward process and the learning process.

Then, a parallel processing, that is, a pipeline processing may be considered as a method for speeding up a signal processing in the neural network model as shown in FIG. 2. This will be explained below along the learning process in the three-layered network as shown in FIG. 2.

1. Forward process in the middle layer

2. Forward process in the output layer

3. Learning process in the output layer

4. Learning process in the middle layer

These four processes are executed in parallel.

However, the learning processes 3 and 4 need the input signals used in the forward processes 1 and 2. To meet the need, it is necessary to hold the input signal in the forward process and use the held signal when executing the learning process.

Figure 17:
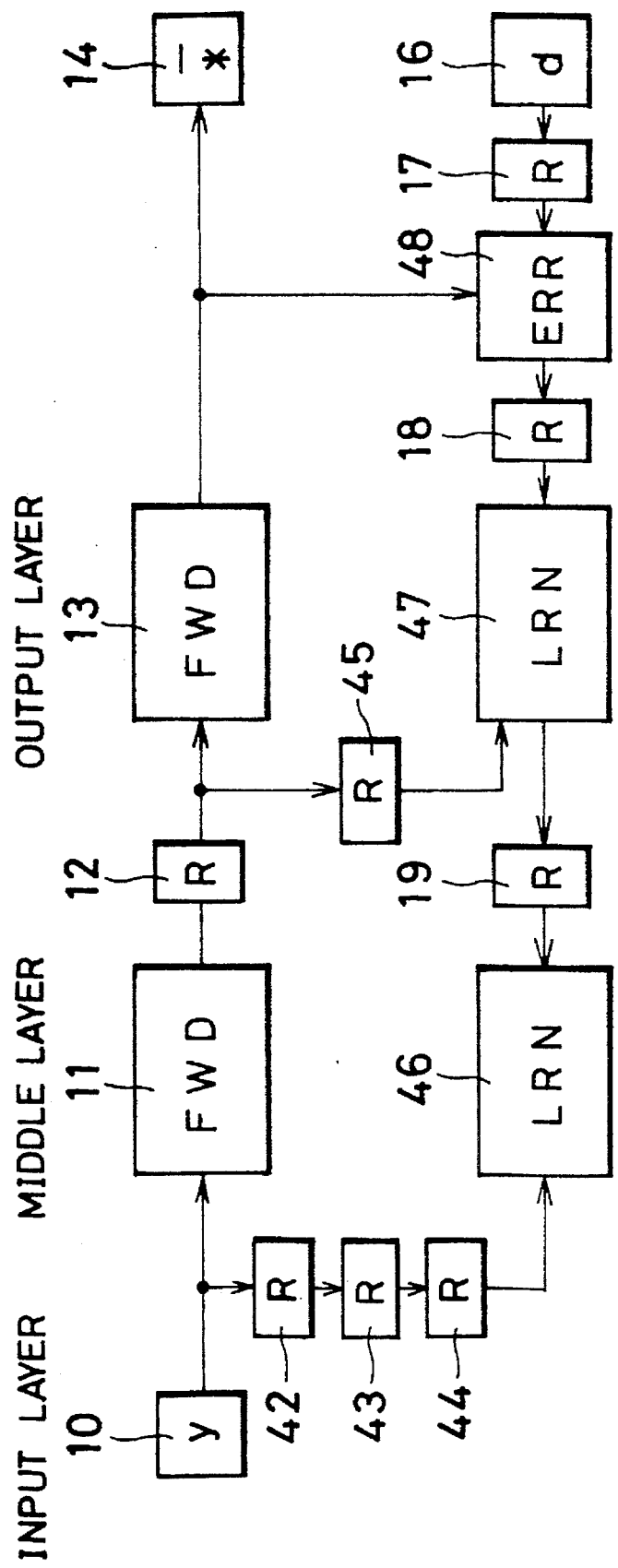
FIG. 17 is a block diagram showing a three-layered hierarchical network according to an embodiment of the invention.
Figure 37:
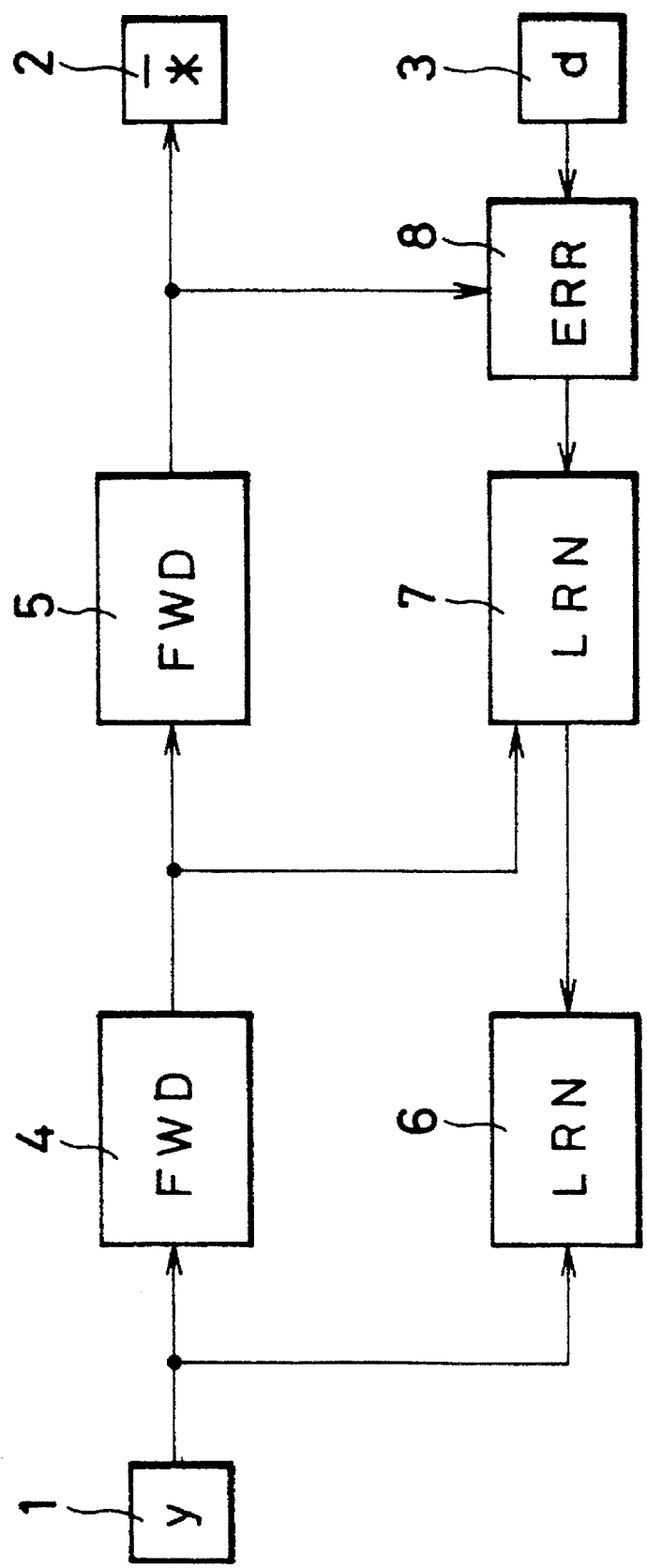
FIG. 37 is a block diagram showing a conventional signal processing circuit.
Figure 38:
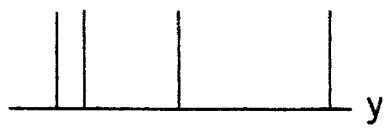
FIGS. 38–41 are graphs showing the signal error in a neural network output layer.
Figure 39:
Figure 40:
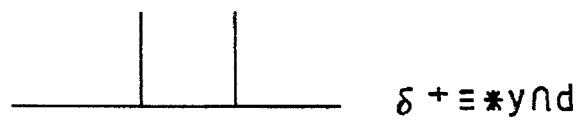
Figure 41:
Figure 42:
FIGS. 42–45 are graphs showing the pulse density system according to the value of a learning constant η.
Figure 43:
Figure 44:
Figure 45:
Figure 46A:
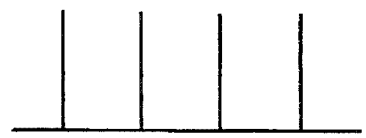
FIGS. 46A–46D illustrate graphical representations for determining a stimulant coupling coefficient.
Figure 46B:
Figure 46C:
Figure 46D:
Figure 47A:
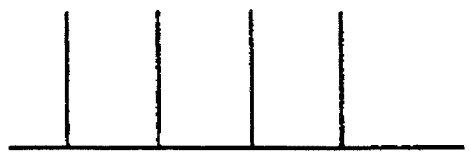
FIGS. 47A–47D illustrate graphical representations for determining a suppressive coupling coefficient.
Figure 47B:
Figure 47C:
Figure 47D:
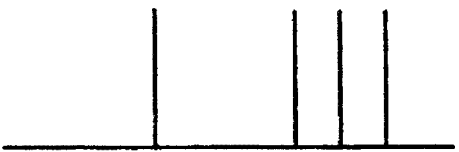

FIG. 17 shows a signal processing circuit which serves to execute the processes 1 to 4 in parallel. The different respect of the circuit shown in FIG. 17 from the respect shown in FIG. 37 is addition of registers 12 and 17 to 19 for holding inter-process data and registers 42 to 44 for holding an input signal in the forward process during a specific period. An input signal 10 corresponds to the input signal 1. An output 14 corresponds to the output 2. An LRN circuit 46 corresponds to the LRN circuit 6. An LRN circuit 47 corresponds to the LRN circuit 7. An ERR circuit corresponds to the ERR circuit 8. An FWD circuit 11 corresponds to the FWD circuit 4. An FWD circuit 13 corresponds to the FWD circuit 5.

Later, the description will be oriented to each of the processes to be executed in parallel.

(1) The input signal 1 is given to activate the FWD circuit 11 to execute the forward process in the middle layer. The register 12 reads the result from the FWD circuit 11. The register 42 reads the input signal 10.

(2) The result is read out of the register 12. Based on the result, the FWD circuit 13 serves to execute the forward process in the output layer. Based on the result of the forward process and a teacher signal read out of the register 17, the error generating circuit 48 serves to generate an error signal in the output layer and the register 18 stores the error signal. The register 45 stores an input signal to the forward process circuit 13 in the output layer. At a time, the input signal to the middle layer is transferred from the register 42 to 43.

(3) The error signal in the output layer is read out of the register 18 and the input signal to the output layer is read out of the register 45. The LRN circuit 47 serves to execute the learning process in the output layer. In this learning process, the error signal for the middle layer is generated and is stored in the register 19. The input signal to the middle layer is transferred from the register 43 to 44.

(4) The error signal in the middle layer is read out of the register 19 and the input signal to the middle layer is read out of the register 44. The LRN circuit 46 serves to execute the learning process in the middle layer.

Figure 18:
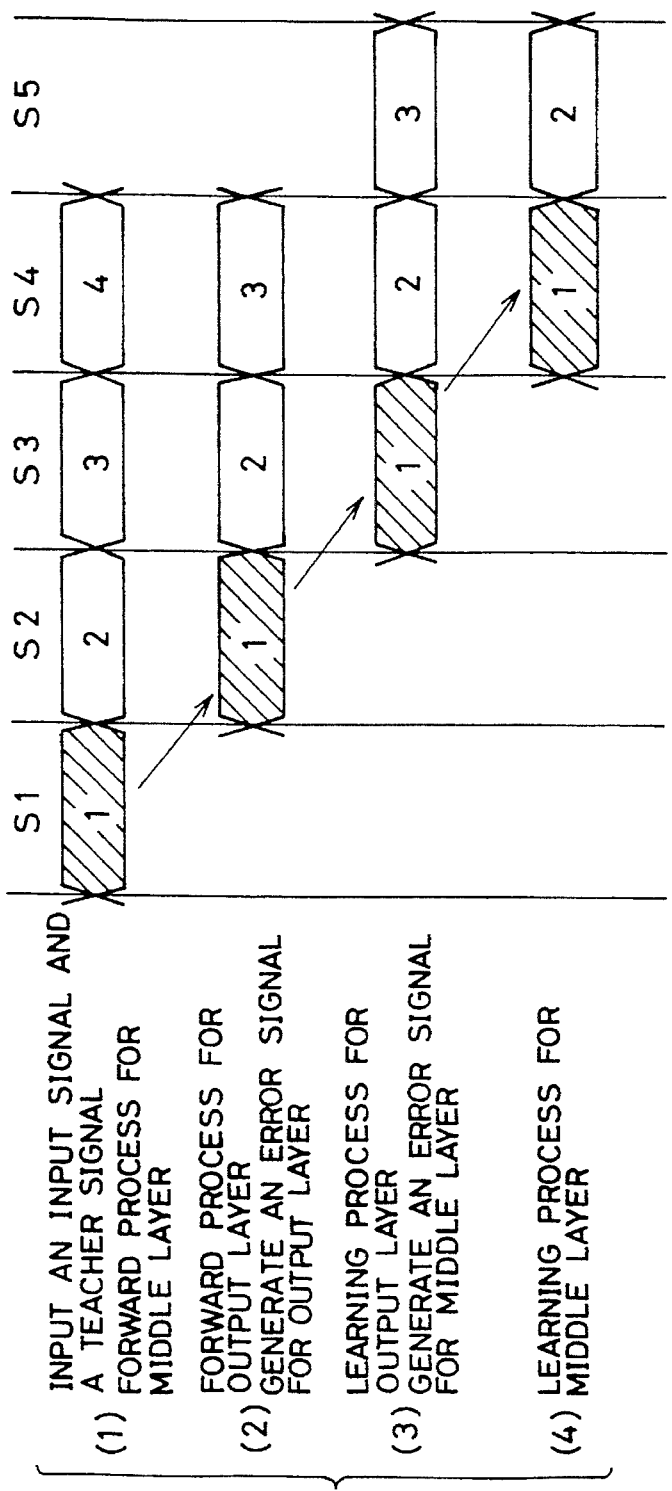
FIG. 18 is a timing chart showing how the embodiment operates.

As mentioned above, the signal processing circuit as shown in FIG. 17 is arranged to provide some registers for storing the input signals and the middle data in the middle layer and the output layer in addition to the circuit shown in FIG. 37. In this arrangement, the desired data may be read out at any time, so that the four processes (1) to (4) may be executed in parallel. The timing chart at the execution time is shown in FIG. 18. As is obvious from this illustration, the three-layered neural network serves to divide one serial process into four and execute these four sub processes in parallel for making the executing speed four times as fast as the conventional signal processing circuit arranged to serially perform one process.

Figure 7:
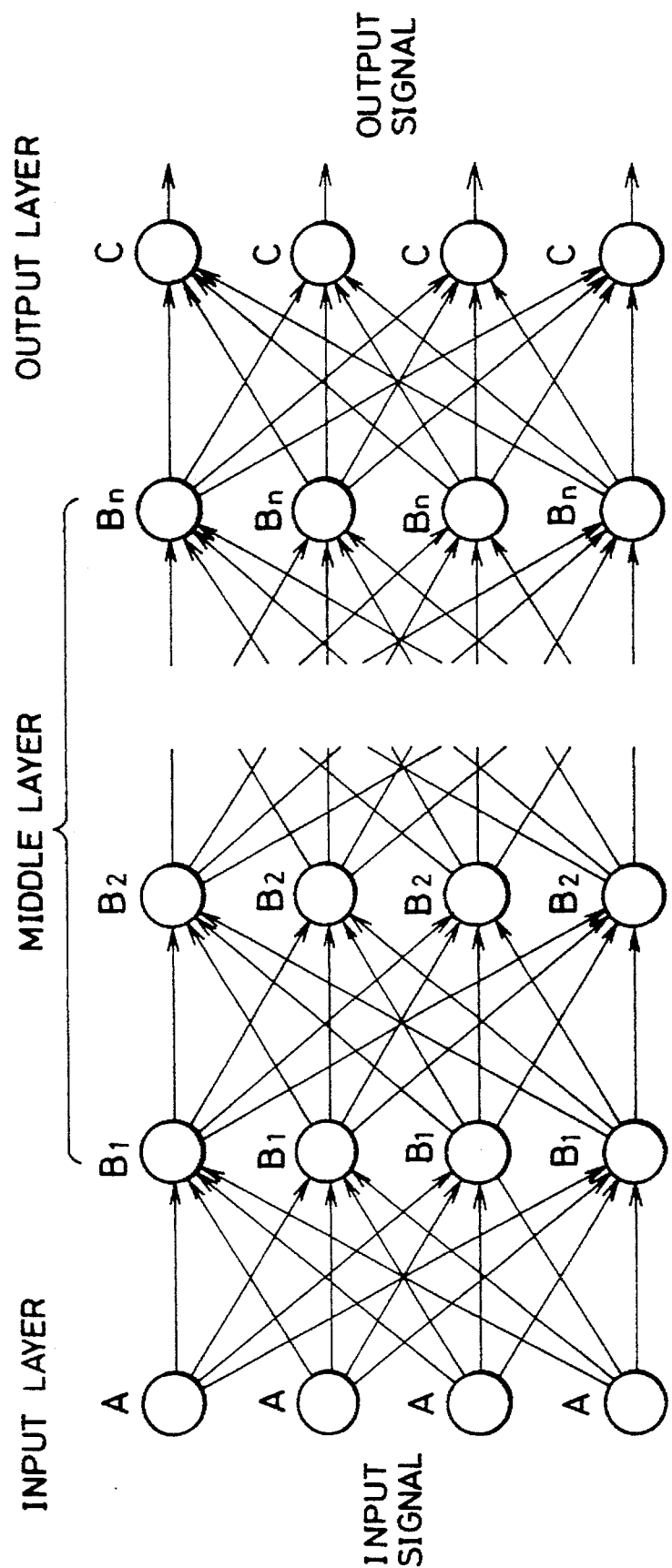
FIG. 7 is an explanatory view showing a forward process to be executed in a multilayered hierarchical network.
Figure 8:
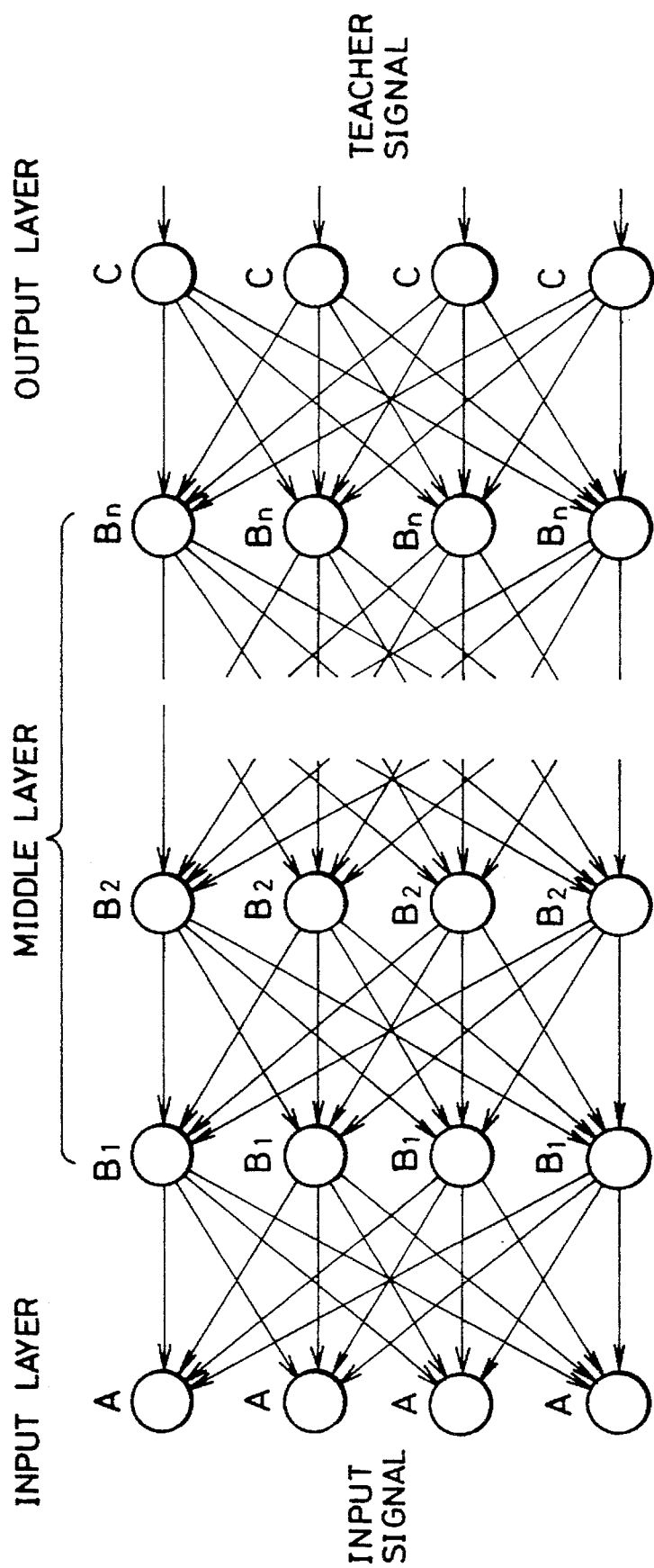
FIG. 8 is an explanatory view showing a learning process to be executed in a multilayered hierarchical network.

As shown in FIGS. 7 and 8, if more layers are used in the neural network, the pipeline processing is made possible by executing the forward process and the learning process in parallel. Without the parallel processing, more layers used in the neural network need a longer operating time for the forward process and the learning process accordingly. The use of the parallel processing just needs the same operating time as the three-layered neural network independently of the number of layers. The speed processing is made possible. If more layers are used in the network, the stage number of the registers 42 to 45 may be adjusted on the number of pipeline stages.

Figure 1:
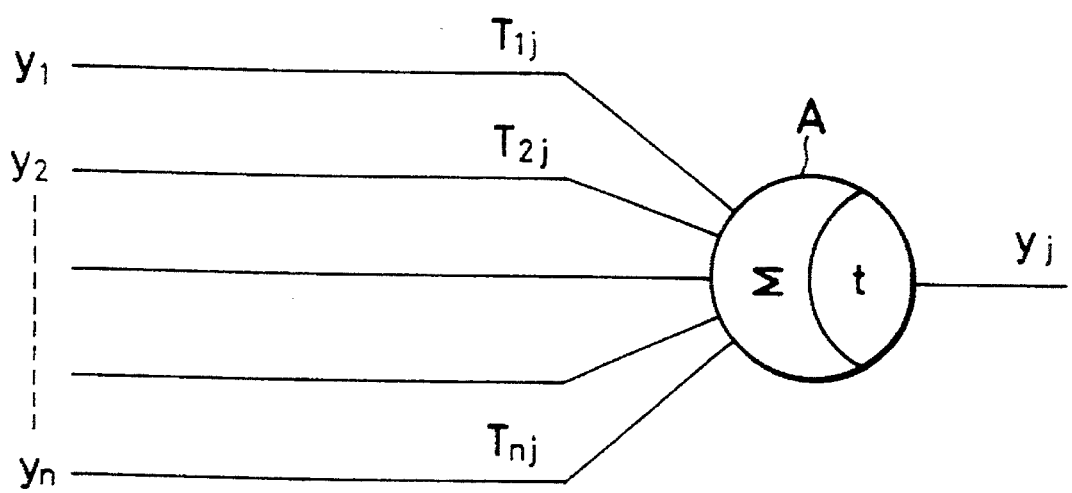
FIG. 1 is a model view showing one neuron unit included in a typical neural network.
Figure 14:
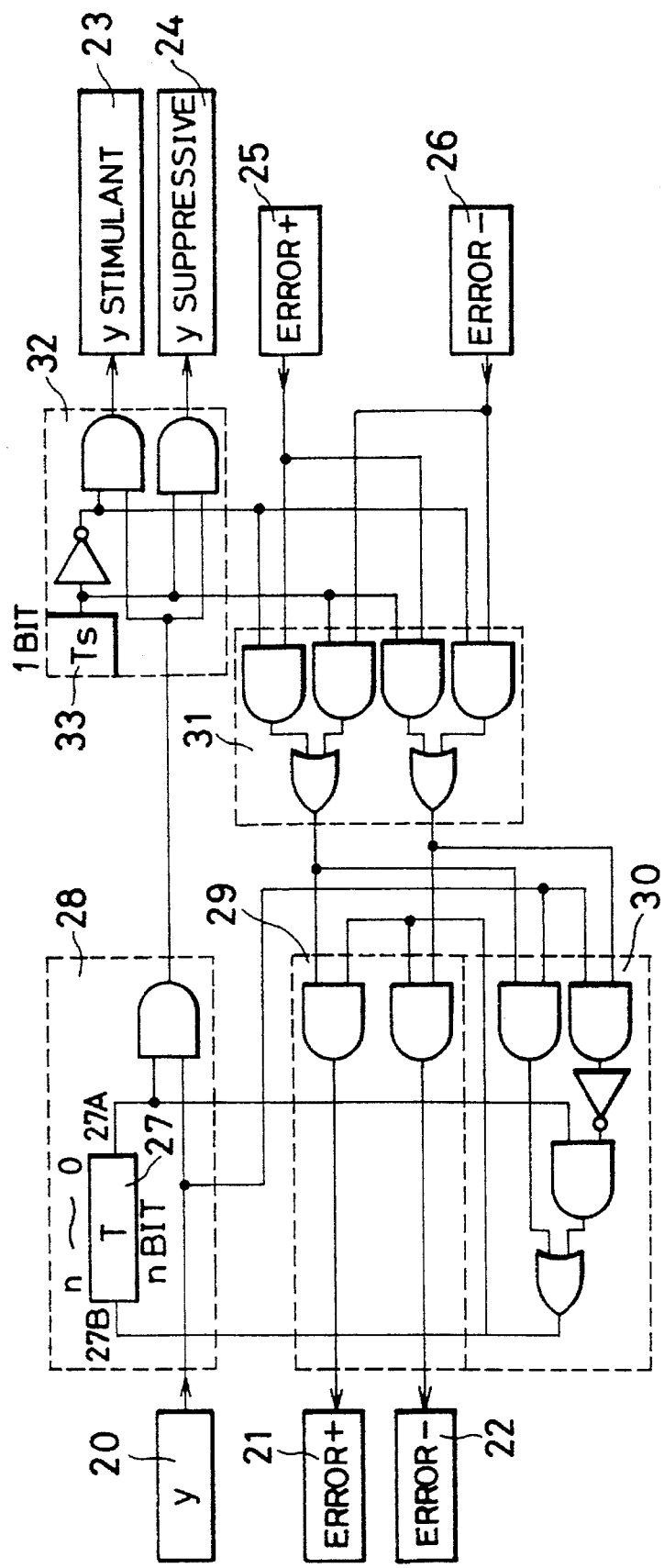
FIG. 14 is a circuit diagram showing a circuit arrangement corresponding to a line (coupling line) of FIG. 2.
Figure 15:
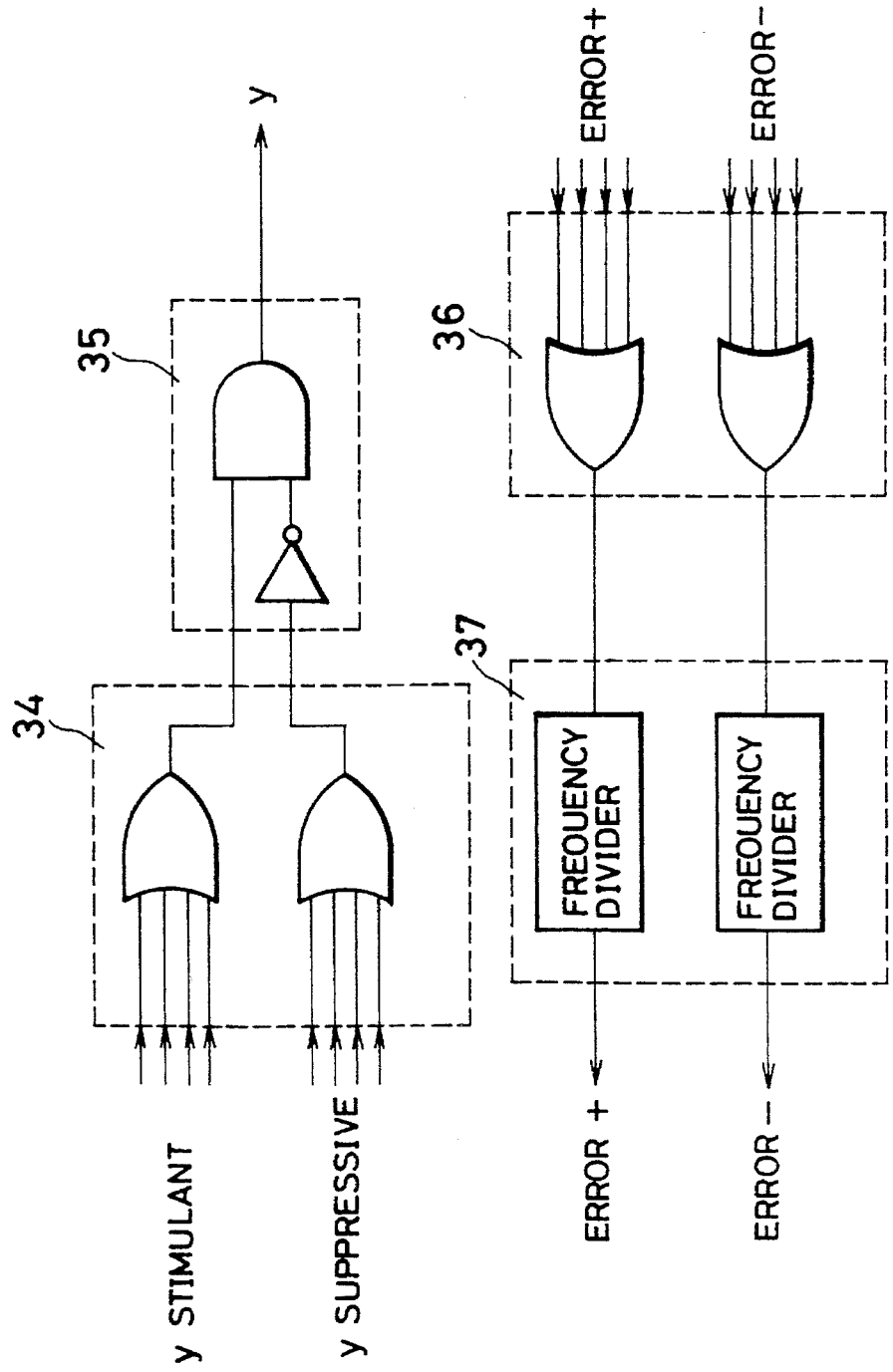
FIG. 15 is a circuit diagram showing a circuit arrangement corresponding to a circle (neuron unit) of FIG. 2.
Figure 16:
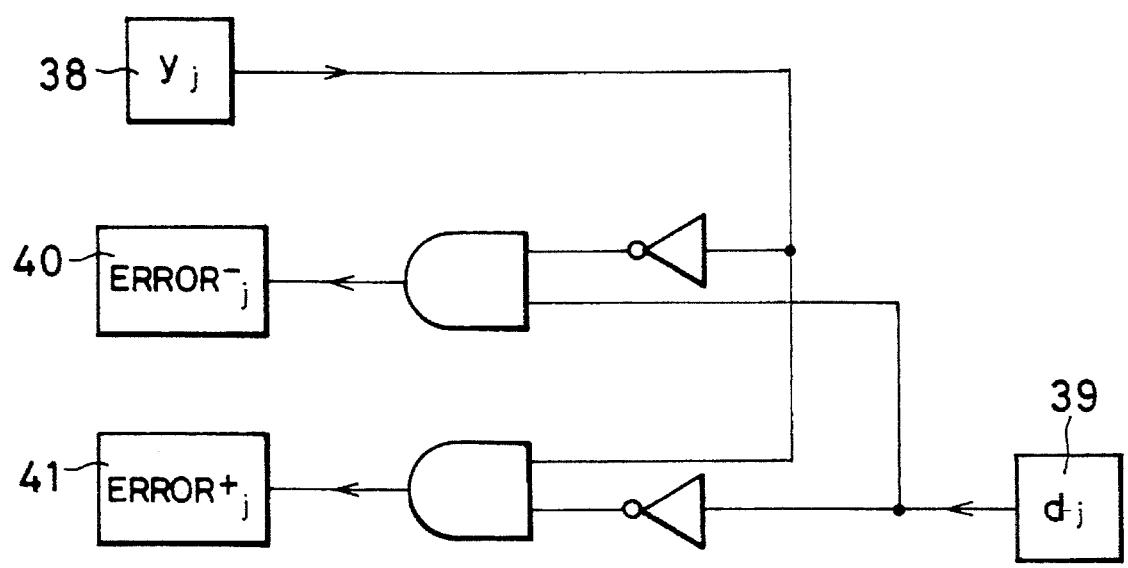
FIG. 16 is a circuit diagram showing a circuit for deriving an error signal for an output layer from an output of an output layer and a teacher signal.
Figure 19:
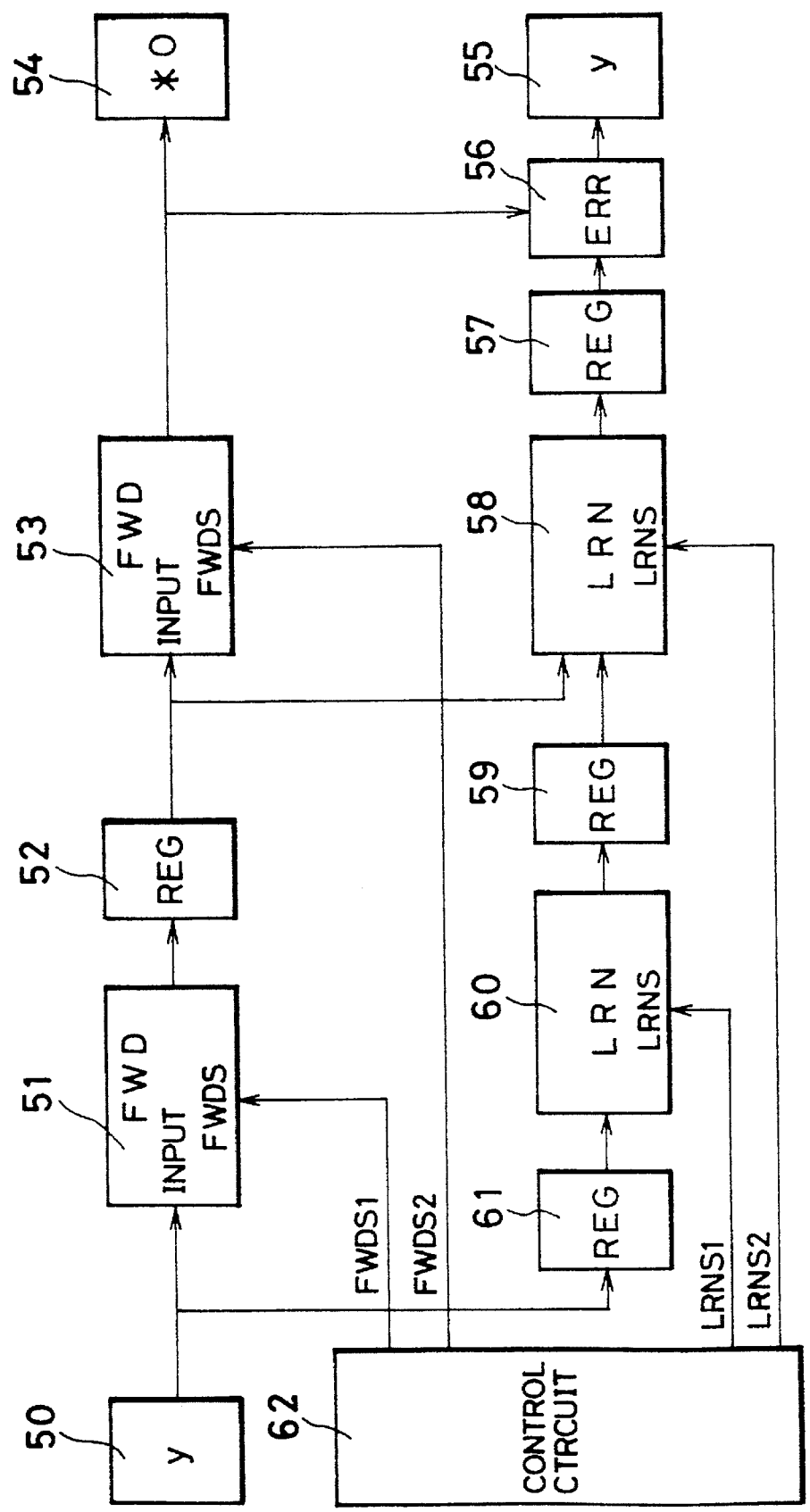
FIG. 19 is a block diagram showing a three-layered hierarchical network according to another embodiment of the invention.

FIG. 19 shows another signal processing apparatus arranged to execute the foregoing sub processes in parallel. An FWD circuit 51 denoted by 51 is a circuit for performing the forward process of the middle layer A2 and an FWD circuit denoted by 53 is a circuit for performing the forward process of the output layer A3 as shown in FIG. 2. Matching these FWD circuits to those in the pulse density manner, the FWD circuits 51, 53 correspond to the components 28, 32 shown in FIG. 1 and the components 34, 35 shown in FIG. 15, respectively. An LRN circuit denoted by 60 is a circuit for executing the learning process of the middle layer A2 and an LRN circuit denoted by 58 is a circuit for executing the learning process of the output layer A3 as shown in FIG. 2. The LRN circuit 60 corresponds to the components 29, 30, 31 shown in FIG. 14 and the LRN circuit 58 corresponds to the components 36, 37 shown in FIG. 15. An ERR circuit 56 operates to derive an error signal in the output layer, which circuit is shown in FIG. 16. Later, the description will be oriented to the learning processes to be executed in parallel as referring to FIGS. 19 and 20.

Figure 20:
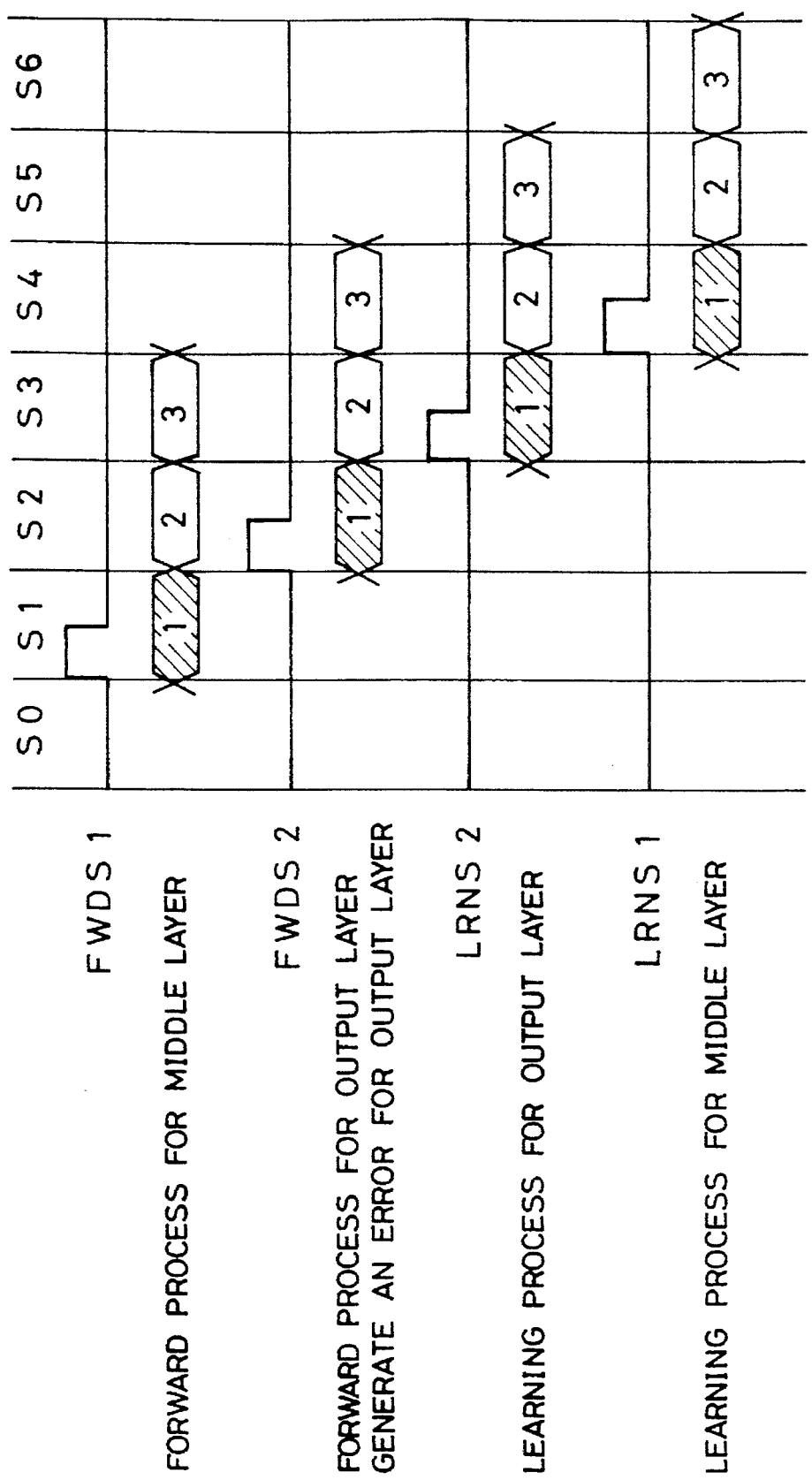
FIG. 20 is a timing chart showing how the embodiment shown in FIG. 19 operates.

(1) When an input signal 50 is given onto the input layer, at a state S1 shown in FIG. 20, a control circuit 62 operates to issue a forward process start signal FWDS1 for the middle layer. With this signal, an FED circuit 51 for the middle layer serves to execute the forward process in the middle layer and a register 52 stores the executed result. At the state S1, the input signal 50 is stored in the register 61.

(2) At the state S2, the control circuit 62 operates to issue a forward process start signal FWDS2 for the output layer. In response to this signal, the result stored in the register 52 is propagated to the FWD circuit 53 of the output layer. In the FWD circuit 58, the forward process of the output layer is executed so that the output 54 may be output. This is the completion of the forward process. In the learning process, a teacher signal 55 is further given to the output layer. With this teacher signal, the error signal in the output layer is generated. This error signal is stored in the register 57.

(3) At the state S3, the control circuit 62 operates so issue a learning process start signal LRNS2 for the output layer to the LRN 58. The LRN 58 executes the learning process in the output layer, based on the error signal in the output layer stored in the register 57 and the executed result of the forward process in the middle layer stored in the register 52. The error signal in the middle layer is generated in the LRN 58 and then is stored in a register 59.

(4) At a state S4, the control circuit 62 operates to issue a learning process start signal LRNS1 for the middle layer to the learning circuit LRN 60. The error signal in the middle layer, stored in the register 59, is propagated to the learning circuit LRN 80 for the middle layer in which the learning process in the middle layer is executed. This is the completion of the learning process.

The above-mentioned process is a process for a three-layered hierarchical network. If the total number of layers in a neural network is increased, as shown in FIGS. 7 and 8, by executing the forward process and the learning process in parallel, the pipeline processing is made possible. Due to the pipeline processing, the processing speed for this multilayered neural network is the same as that for the three-layered neural network, which means realization of high-speed processing in the multilayered neural network.

Figure 21:
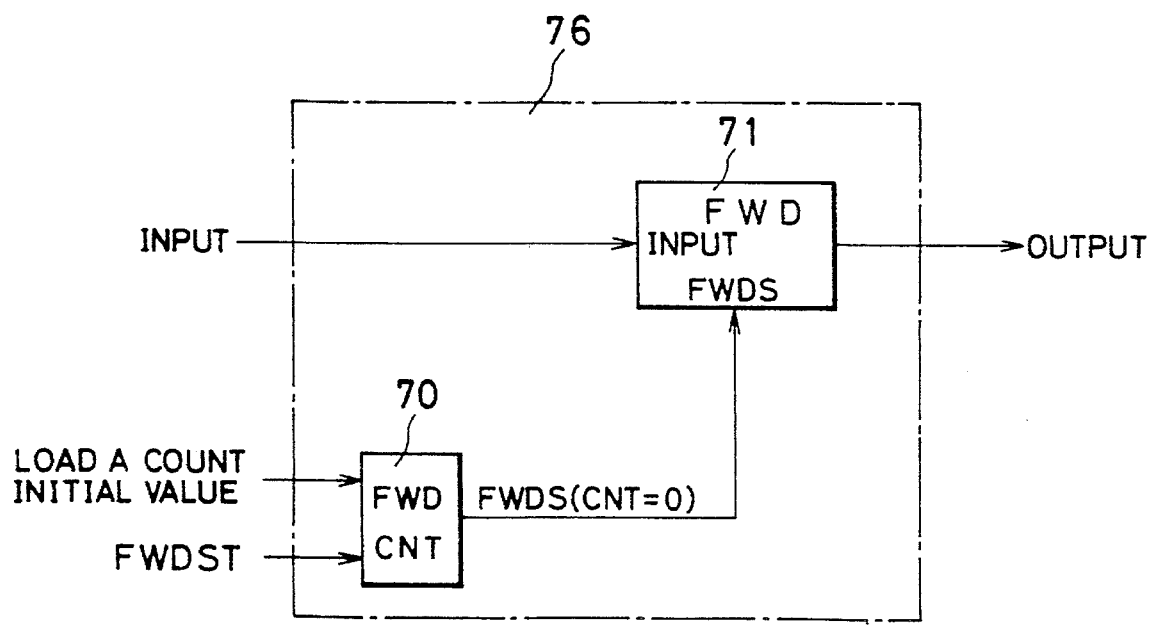
FIG. 21 is a block diagram showing an essential part according to another embodiment of the invention.

According to another embodiment of the invention, the start timing for the forward process of the middle layer or the output layer may be freely adjusted. Each of the middle layer and the output layer, as shown in the block diagram of FIG. 21, provides a forward process circuit 76a having a forward process counter (FWD CNT) 70 and a circuit (FWD) 71 for executing the forward process.

The FWD CNT 70 serves to generate a forward process start signal FWDS and output it to the FWD. Concretely, before transferring to the forward process, an initial value is loaded in the FWD CNT 70. Then, when starting the forward process, the forward process start signal FWDS is issued to the FWD CNT 70. In response to the signal FWDS, the counter starts to operate. For example, when the counter value reaches "0", the FWD CNT 70 starts to issue the forward process start signal FWDS to the FWD 71 for the corresponding layer, that is, the middle layer or the output layer. A circuit diagram showing a three-layered hierarchical network arranged to have the forward process circuit 76 is illustrated in FIG. 23.

Figure 22:
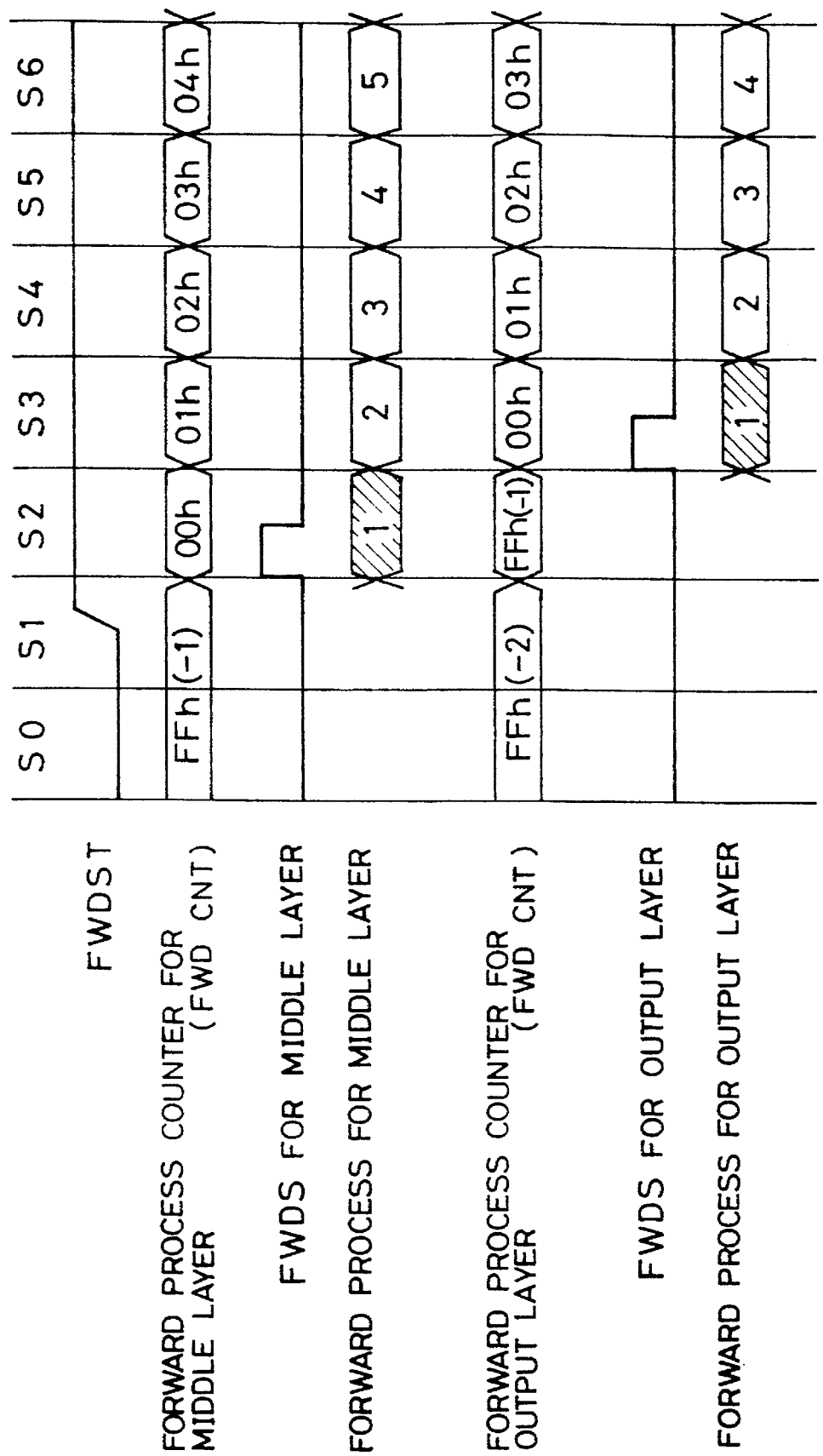
FIG. 22 is a timing chart showing how the embodiment operates.

The forward process to be executed in the three-layered hierarchical network will be described as referring to a timing chart of FIG. 22. As shown in FIG. 22, at states S0 and S1, FFh represented in 8-bit binary notation (which corresponds to −1 in decimal notation) is loaded as an initial value in the FWD CNT 70 of the middle layer. FEh represented in 8-bit binary notation (which corresponds to −1 in decimal notation) is loaded as an initial value in the FWD CNT 70 of the output layer. In this state, a control circuit 77 (see FIG. 23) provided in the neural network starts to issue the forward process start signal FWDST. In response, the FWD CNTs 70 of the middle layer and the output layer are activated. This is the start of the forward process.

At a state S2, the count value reaches 00h in the FWD CNT 70 of the middle layer. The forward process start signal FWDS for the middle layer is issued. In response, the forward process for the middle layer is started. At a state S3, the count value reaches 00h in the FWD CNT 70 for the output layer. The forward process start signal FWDS for the output layer is activated. This is the start of the forward process for the output layer.

Figure 9:
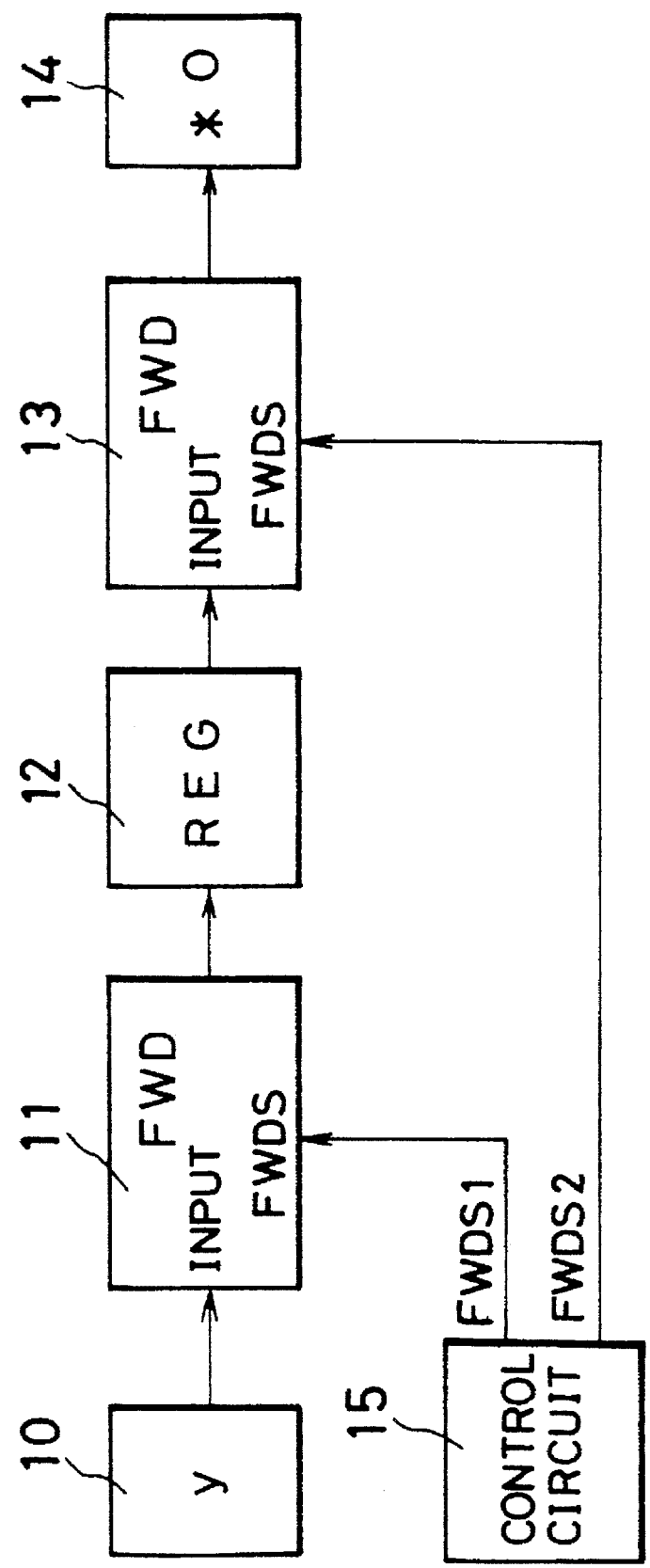
FIG. 9 is a circuit diagram showing a circuit for performing a forward process for the three-layered hierarchical network.
Figure 10:
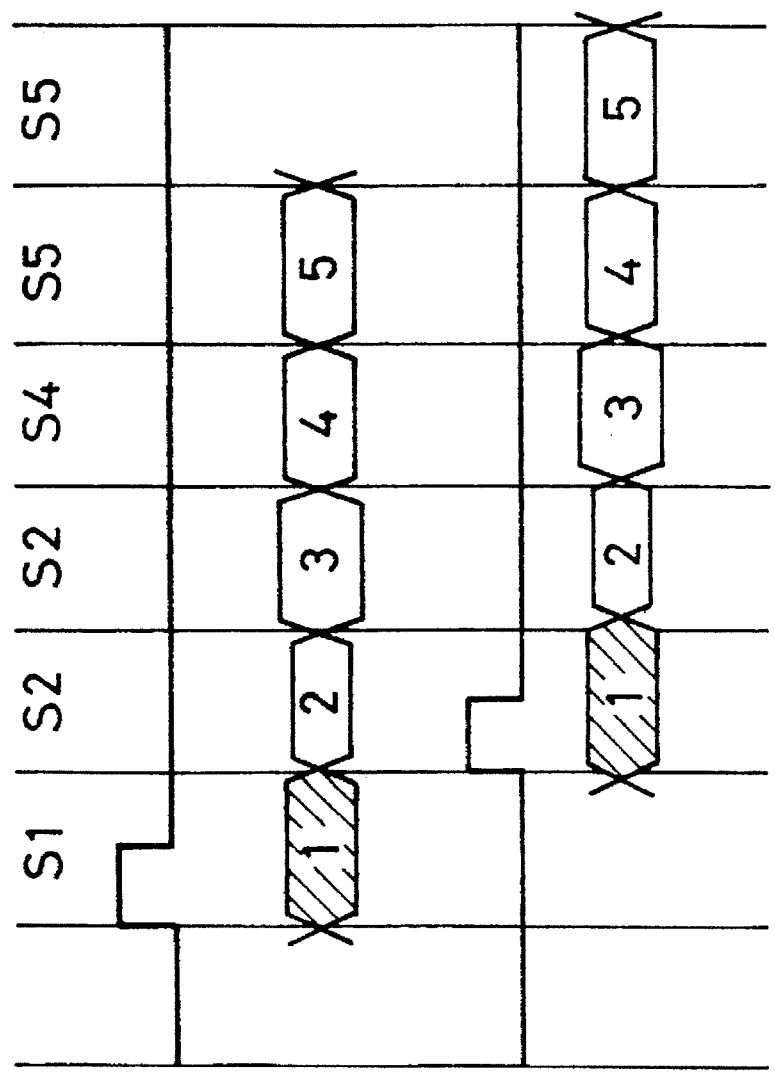
FIG. 10 is a timing chart showing a forward process for the three-layered hierarchical network.
Figure 23:
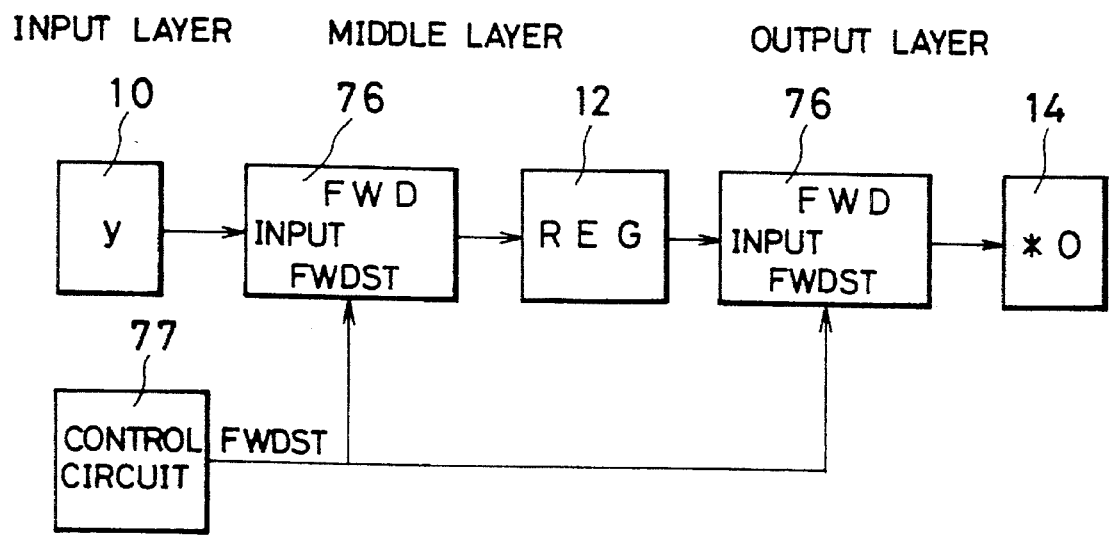
FIG. 23 is a block diagram showing a three-layered hierarchical network according to the embodiment.
Figure 24:
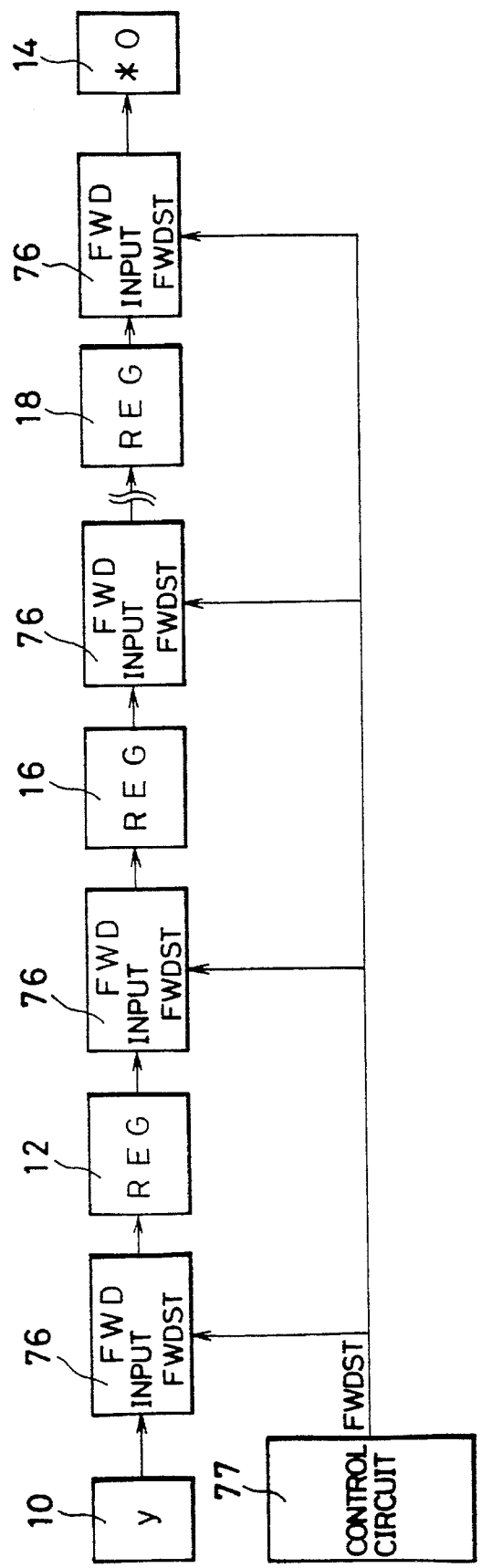
FIG. 24 is a block diagram showing a multilayered hierarchical network according to the embodiment.

As mentioned above, in this three-layered network, as shown in FIG. 23, the middle layer and the output layer share one forward process start signal. This network is more controllable than the prior art shown in FIG. 9. As in the multilayered network (see FIG. 7) having two or more middle layers, one control line is shared as shown in FIG. 24. Hence, this multilayered network is also more controllable than the prior art shown in FIG. 21.

According to another embodiment of the invention, like the embodiment shown in FIG. 21, the forward process timing for the middle layer or the output layer is allowed to be freely set. Each of the middle layer and the output layer provides a forward process circuit 76 having a process counter (PRO CNT) 72, a forward process start state setting register (FREG) 73, a comparator (CMP) 74 and a circuit (FWD) for executing the forward process.

A forward process start state is loaded in the FREG 73 before transferring to the forward process. The PRO CNT 72 is reset before transferring to the forward process so that the PRO CNT 72 may start to operate in response to the forward process start signal FWDST. The CMP 74 receives a value of the FEG 73 and a value of the PRO CNT 72. If both of the values are made equal, the forward process start signal FWDS is outputted to the FWD 75.

Figure 25:
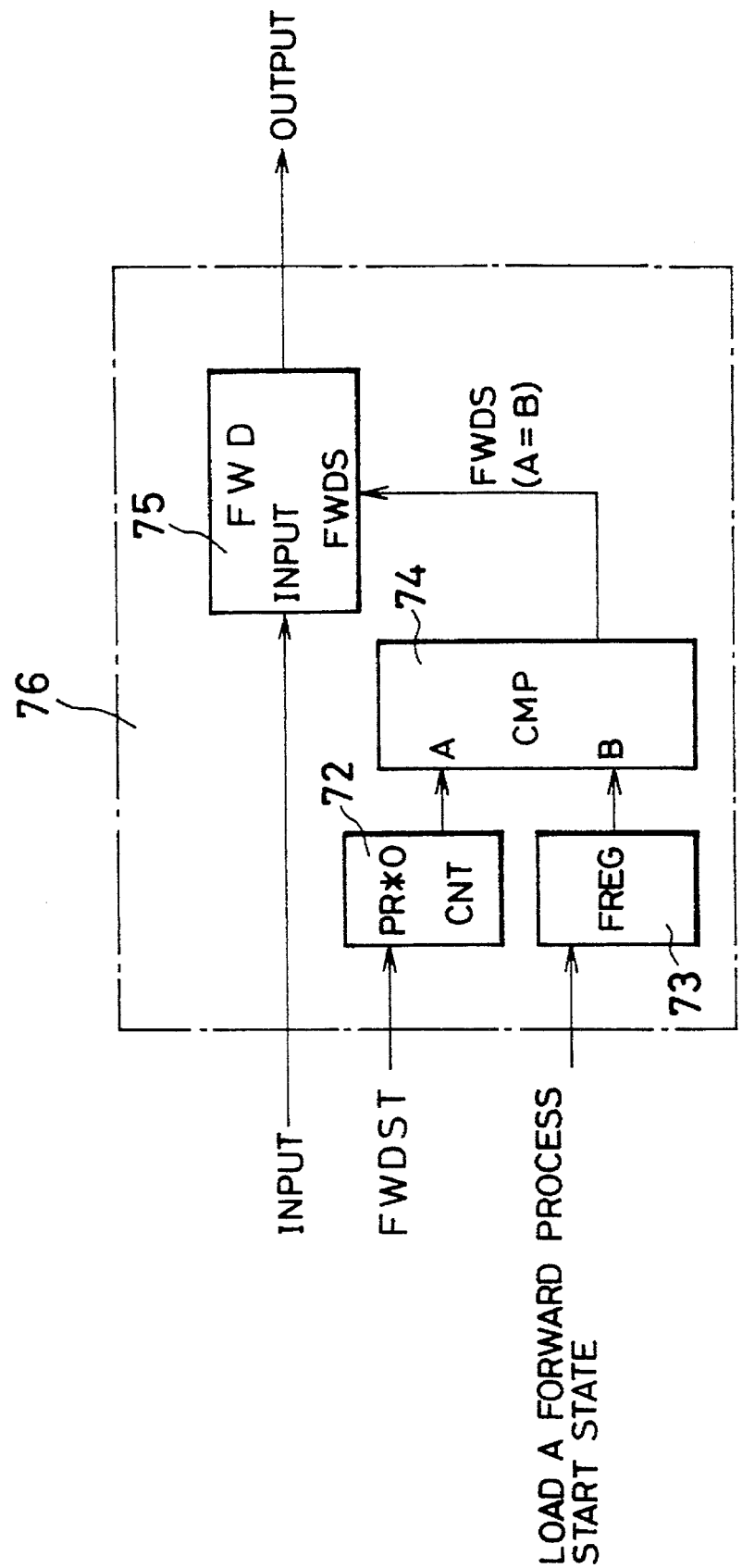
FIG. 25 is a block diagram showing an essential Part of the embodiment.

The three-layered hierarchical network arranged to have the forward process circuit 76 shown in FIG. 25 is just as shown in FIG. 23. As illustrated in the timing chart of FIG. 26, before transferring to the forward process, at states S0 and S1, 01h represented in 8-bit notation is stored in the FREG 73 for the output layer. Further, the FREG 73 for the output layer stores 02h. When transferring to the forward process, the PRO CNT 72 is reset and the forward process start signal FWDST is issued so that the PRO CNT 72 may start to operate. This is the start of the forward process.

In the middle layer, when the count value of the PRO CNT 72 reaches 01h, that is, at a state S2, the forward process start signal FWDS is activated to issue. This is the start of the forward process. In the output layer, when the count value of the PRO CNT 72 reaches 02h, that is, at a state S3, the forward process start signal FWDS is activated. This is the start of the forward process.

In the process as described above, the pipeline processing to be executed in the three-layered network may apply to the forward process.

Figure 11:
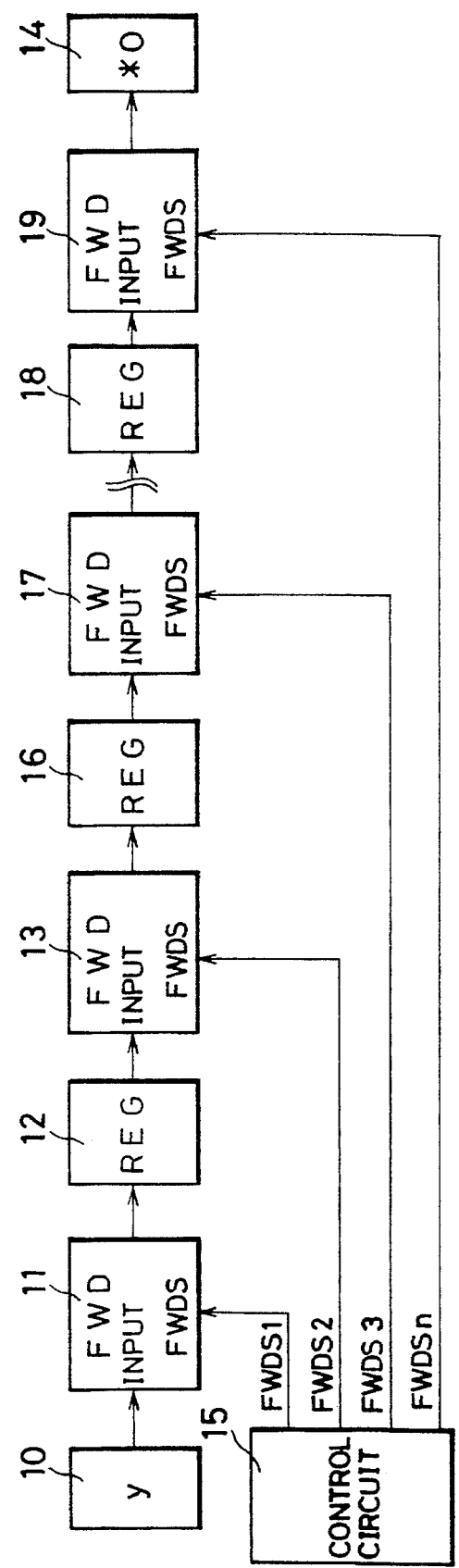
FIG. 11 is a circuit diagram showing a circuit for performing a forward process for the multilayered hierarchical network.
Figure 12:
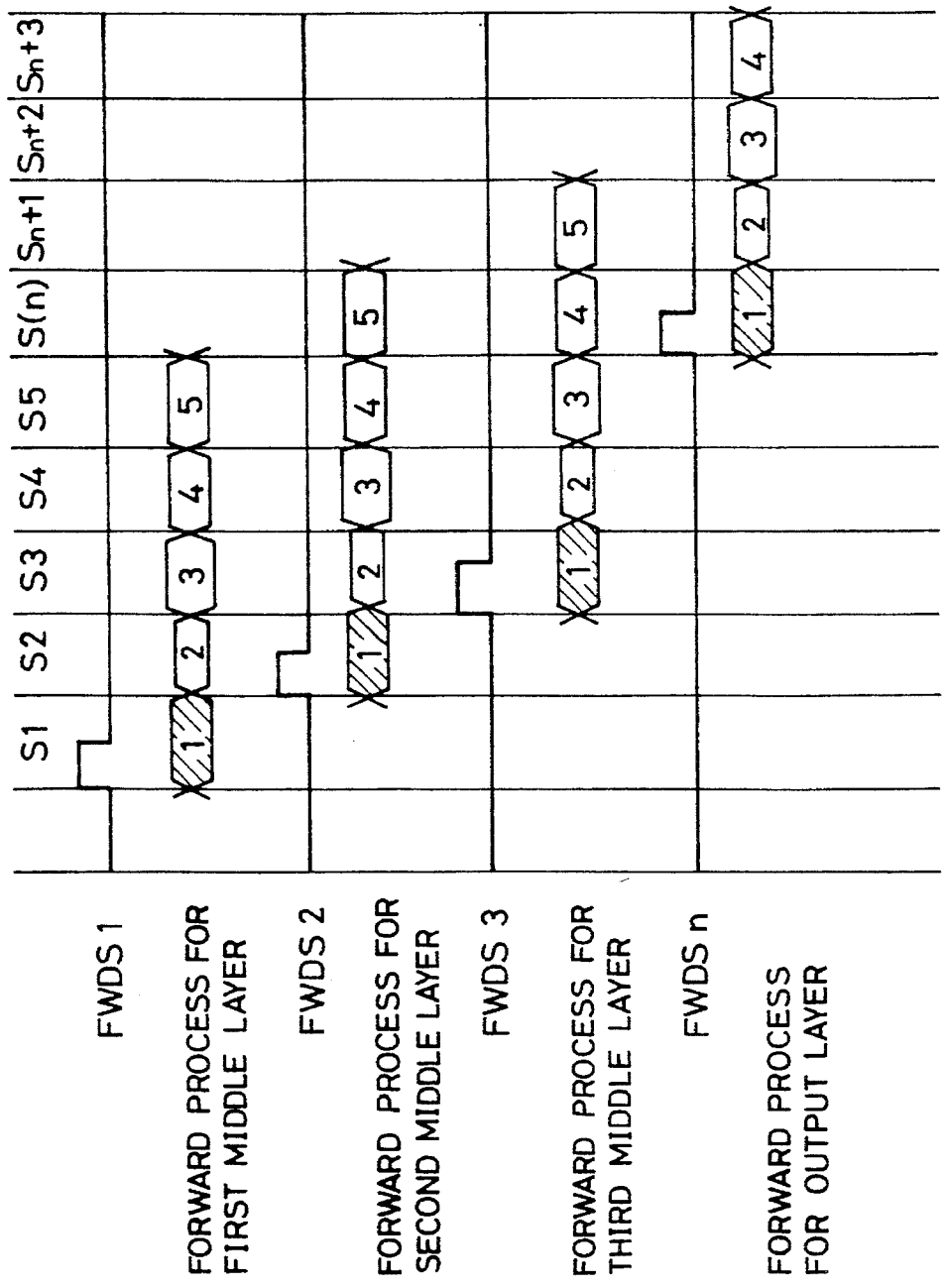
FIG. 12 is a timing chart showing a forward process for the multilayered hierarchical network.
Figure 13:
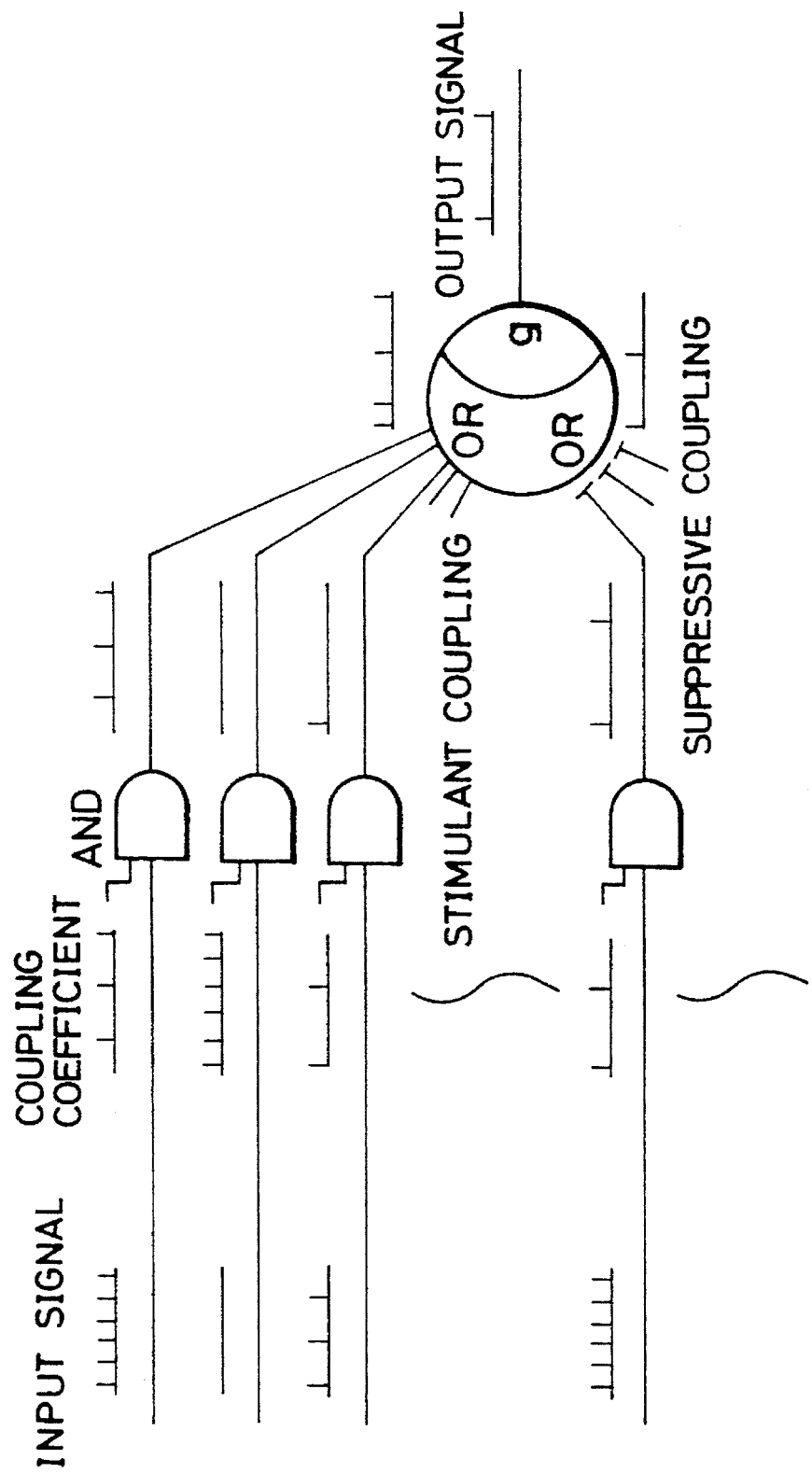
FIG. 13 is a circuit diagram showing a neuron model circuit.
Figure 26:
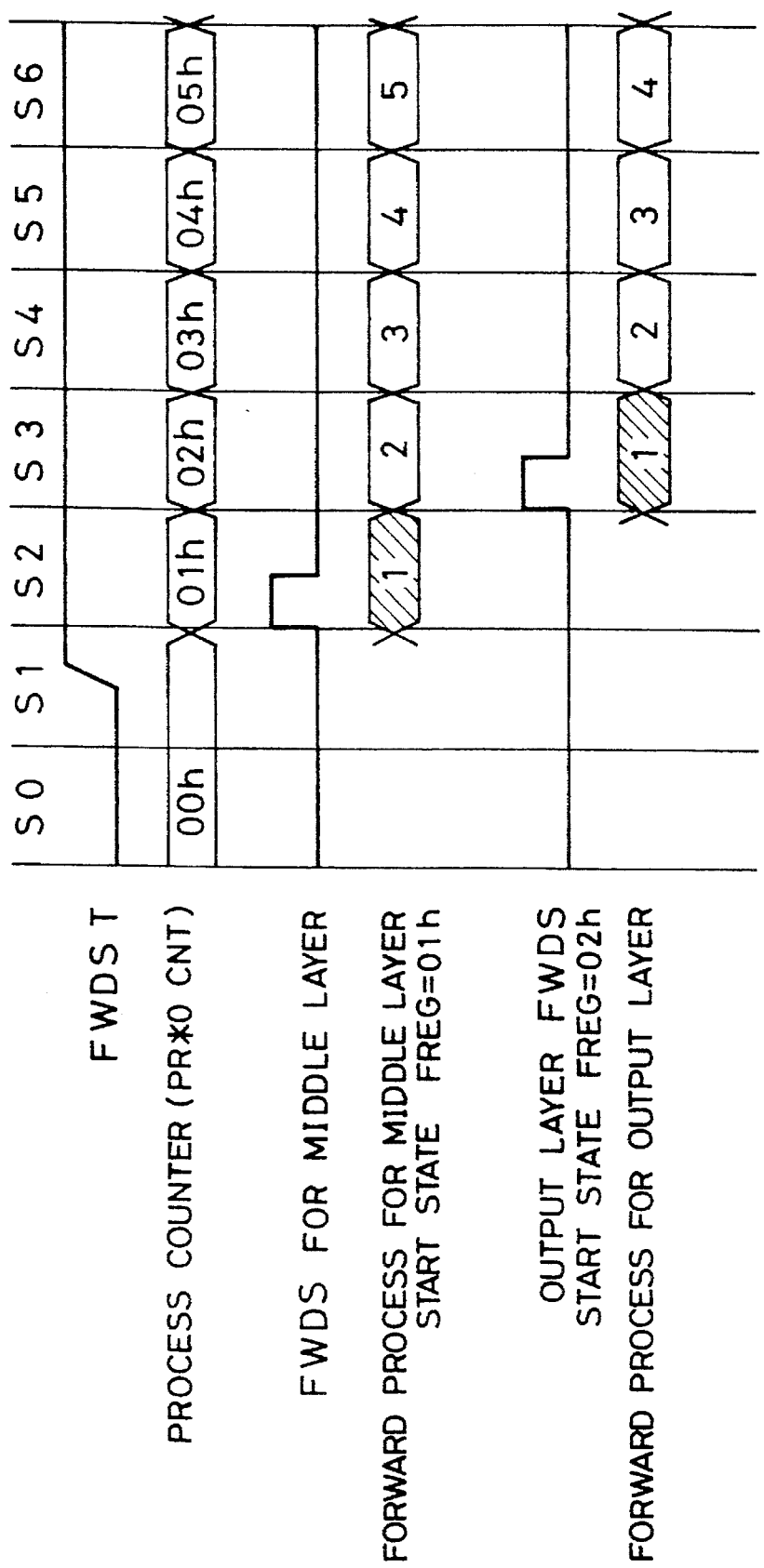
FIG. 26 is a timing chart showing an essential part of another embodiment of the invention.

This three-layered hierarchical network may share the forward process start signal for both of the middle layer and the output layer on one control line as shown in FIG. 23. This network is, therefore, more controllable than the prior art shown in FIG. 9. Like the multilayered network having two or more middle layers (see FIG. 7), the control line may be shared as shown in FIG. 26. Hence, this multilayered network is more controllable than the prior art shown in FIG. 11.

According to another embodiment of the invention, the start timing on which the forward process and the learning process for the middle layer or the output layer are executed is allowed to be freely set. The concept of this embodiment is that the starting method for the forward process shown in FIG. 21 may apply to the learning process as well.

Figure 27:
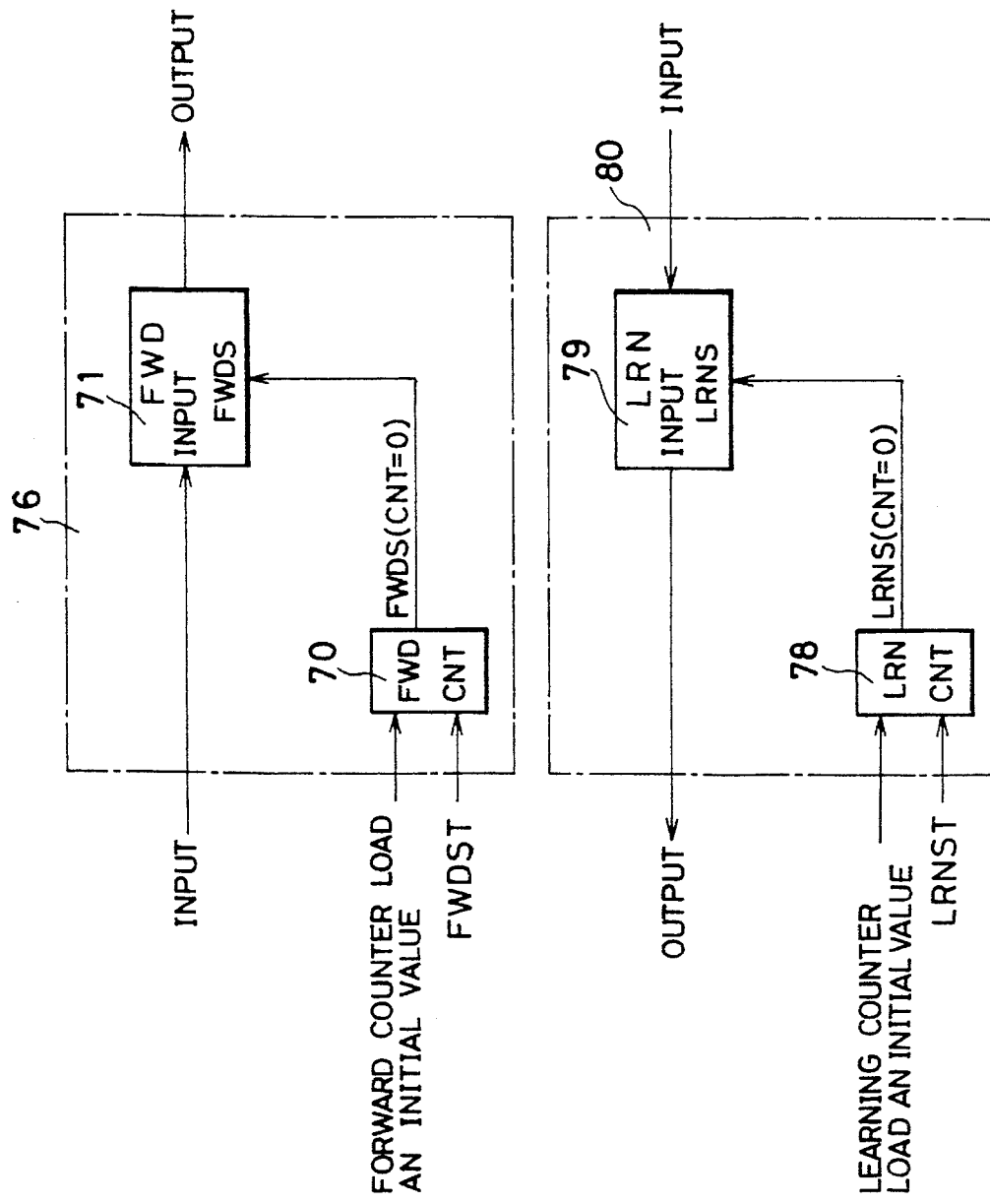
FIG. 27 is a block diagram showing an essential part according to another embodiment of the invention.

In this embodiment, each of the middle layer and the output layer provides a forward process circuit 76 and a learning process circuit 80 as shown in a block diagram of FIG. 27. The forward process circuit 76 has the same arrangement as the forward process circuit 76 shown in FIG. 21, the description of which is not herein for avoiding double descriptions.

The learning process circuit 80 has a learn counter (LRN CNT) 78 and a circuit (LRN) 79 for executing the learning process. A learning process start state is loaded in the LRN CNT 78 before transferring to the learning process. A control circuit 81 operates to issue a learning process start signal LRNST to the LRN CNT 78. In response, the LRN CNT 78 starts to output the learning process start signal LRNST to the LRN 79.

Figure 28:
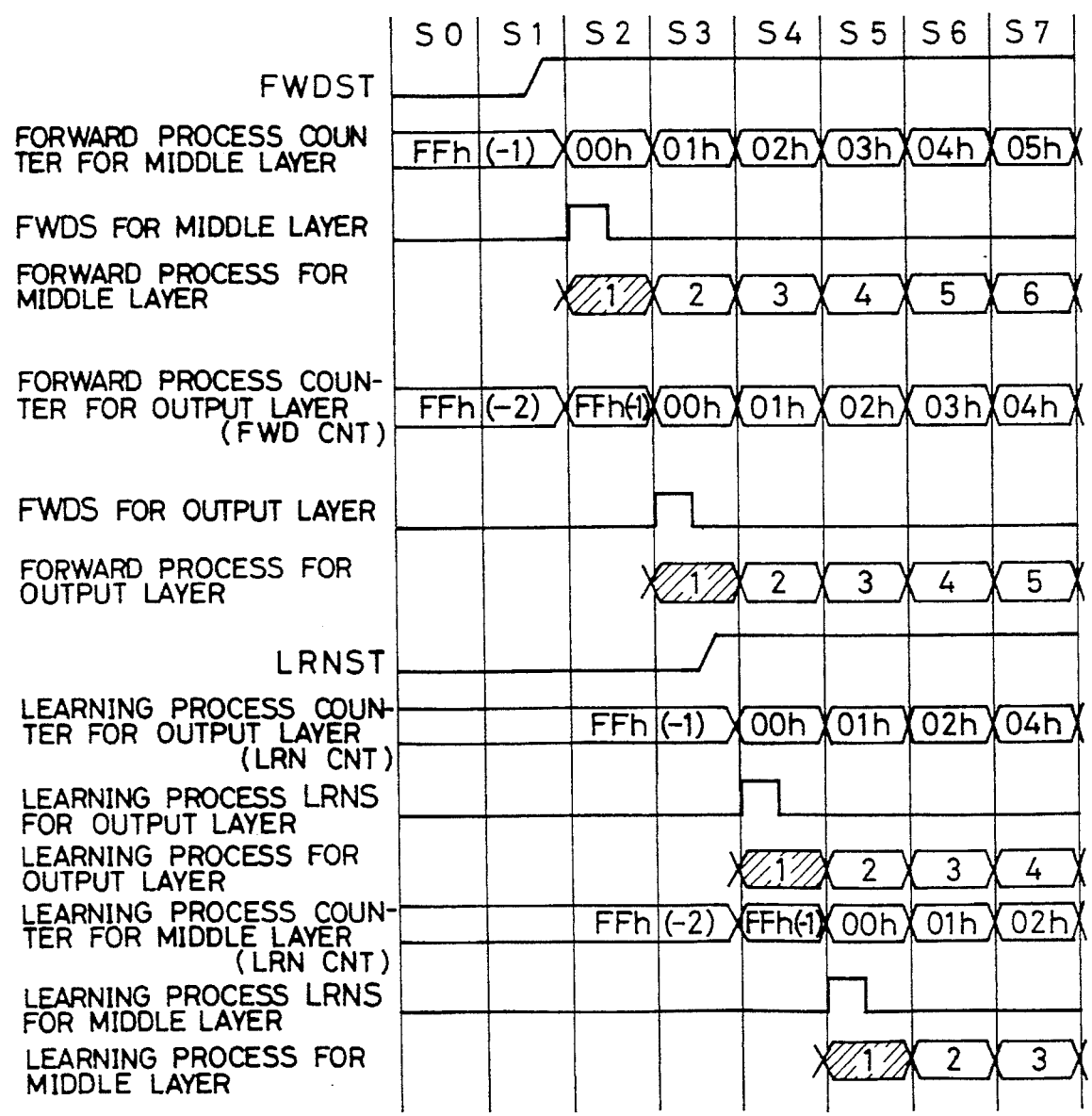
FIG. 28 is a timing chart showing how the embodiment operates.
Figure 29:
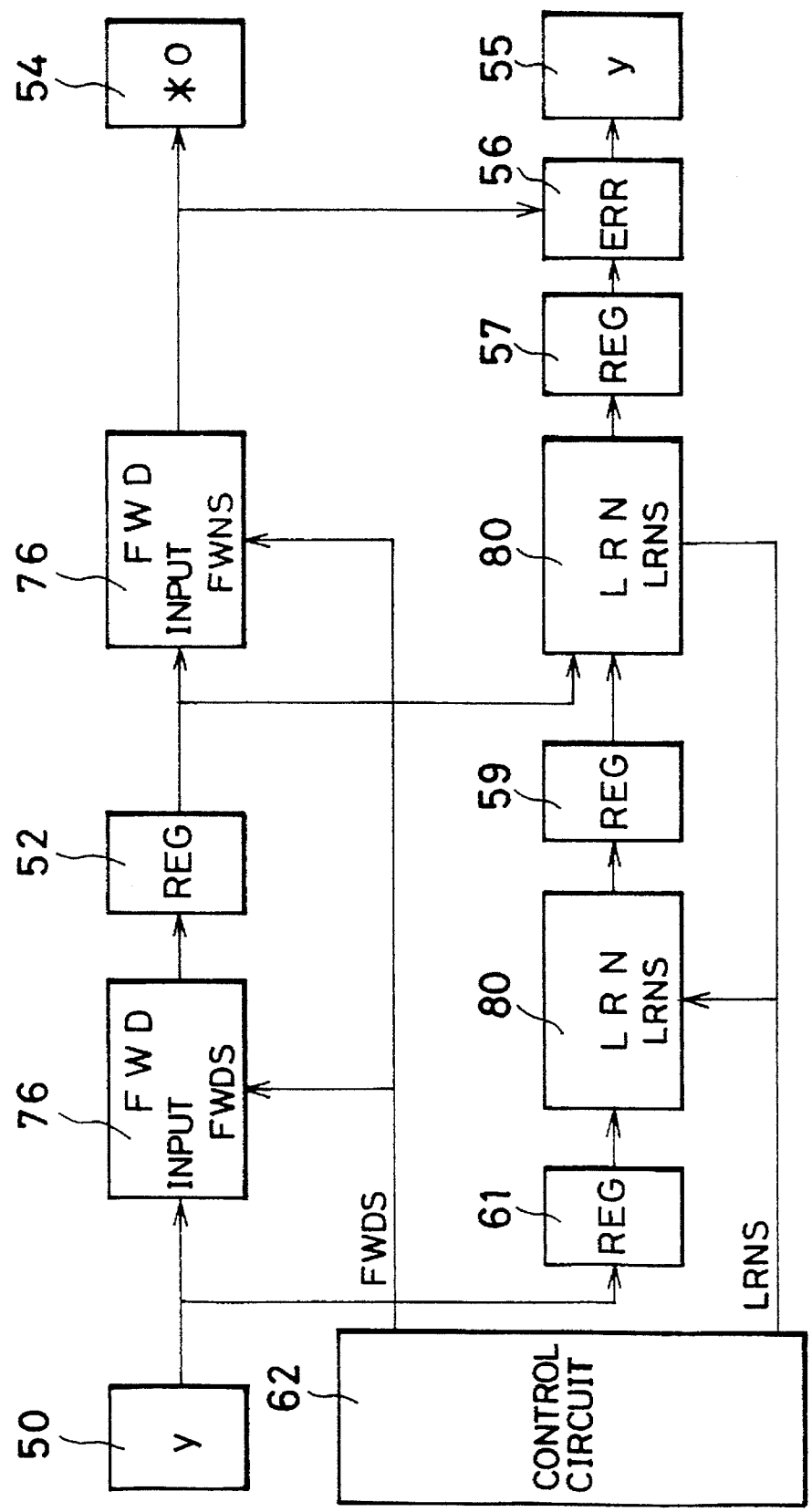
FIG. 29 is a block diagram showing a three-layered hierarchical network according to the embodiment.

In this three-layered hierarchical network, as shown in the timing chart of FIG. 28, at states S0 and S1 before transferring to the learning process, for example, FFh represented in 8-bit notation (which corresponds to −1 in decimal notation) is set as an initial value in the FWD CNT 70 for the middle layer. Likewise, FEh (−2 in decimal notation) is set as an initial value in the FWD NT 70 for the output layer. FFh (−1 in decimal notation) is set as an initial value to the LRN CNT 78 for the output layer. FEh (−2 in decimal notation) is set as an initial value to the LRN CNT 78 for the middle layer.

Next, at a state S1, the control circuit 81 operates to issue the forward start signal. In response, the FWD CNT 70 for each of the middle layer and the output layer is started. At a state S2, the forward process for the middle layer is started. At a state S3, the forward process for the output layer is started. The process up to this point is the same as those of the foregoing embodiments only for the forward process shown in FIGS. 21 to 26.

At a state S3, the control circuit 81 operates to issue the learning process start signal LRNST. In response, the LRN CNT 78 for each of the output layer and the middle layer is activated. When the count value of the LRN CNT 78 for the output layer reaches 00h, that is, at a state 4, the learning process start signal LRNS is outputted from the LRN CNT 78 for the output layer to the LRN 79 for the output layer. In response to the signal LRNS, the learning process for the output layer is started. When the count value of the LRN CNT 78 for the middle layer reaches 00h, that is, at a state S5, the learning process start signal LRNS is outputted from the LRN CNT 78 for the middle layer to the LRN 79 for the middle layer. In response to the signal LRNS, the learning process for the middle layer is started.

According to the foregoing process, the forward process and the learning process for the middle layer and the output layer are executed in parallel. Further, this three-layered hierarchical network enables to share the forward process start signal FWDST for the middle layer and the output layer and the learning process start signal LRNST for the middle layer and the output layer. Hence, the network is more controllable than the prior art shown in FIG. 17. This holds true to the multilayered network.

According to another embodiment of the invention, the start timing on which the forward process and the learning process for the middle layer and the output layer are executed is allowed to be freely set in a different manner from the neurons shown in FIG. 27. The basic concept of this embodiment is that the forward process starting method according to this embodiment shown in FIG. 25 or 26 applies to not the forward process but the learning process.

Figure 30:
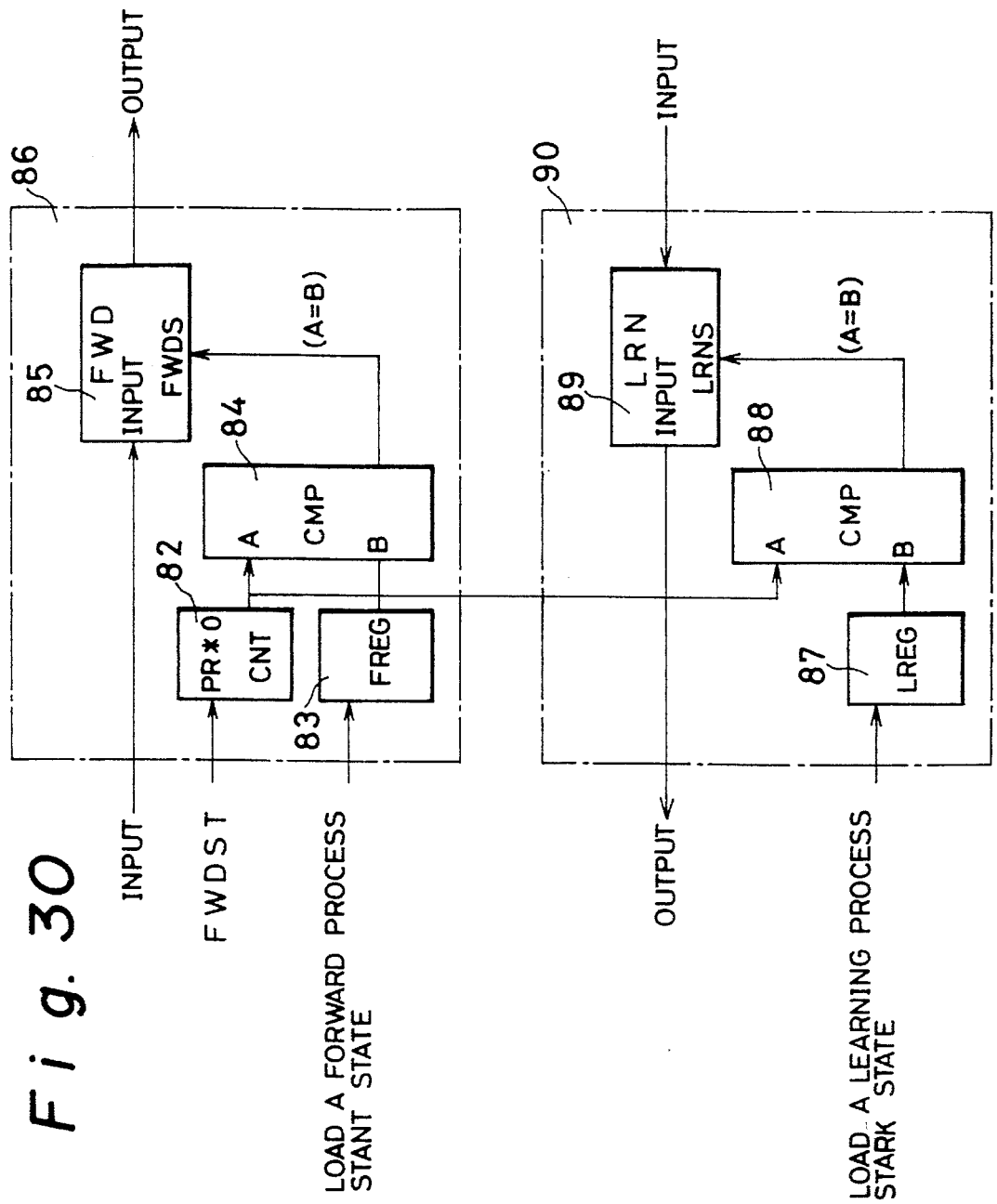
FIG. 30 is a block diagram showing an essential part of another embodiment of the invention.

In the middle layer and the output layer included in this embodiment, as shown in FIG. 30, there are provided a forward process circuit 86 having the same arrangement as the forward process circuit 76 shown in FIG. 26 and a learning process circuit 90.

This forward process circuit 86 includes a process counter (PRO CNT) 82, a forward process start set register (FREG) 83, a comparator (CMP)

and a circuit (FWD) 85 for executing the forward process. The learning process circuit 80 includes a learning process start state set register (LREG) 87, a comparator (CMP) 88 and a circuit (LRN) 89 for executing the learning process.

Before transferring to the forward process, a forward process start state is loaded in the FREG 83 and the PRO CNT 82 is reset. The PRO CNT 82 starts to operate in response to the forward start state. The CMP 84 receives a value of the FREG 83 and a value of the PRO CNT 82 and serves to output the forward process start signal FWDS to the FWD 85 if both of the values are determined to be equal.

Before transferring to the learning process, a learning process start state is loaded in the LREG 87. The CMP 84 receives a value of the LREG 87 and a value of the PRO CNT 82 and serves to output the learning process start signal LRNS to the LRN 89 if both of the values are determined to be equal.

Figure 31:
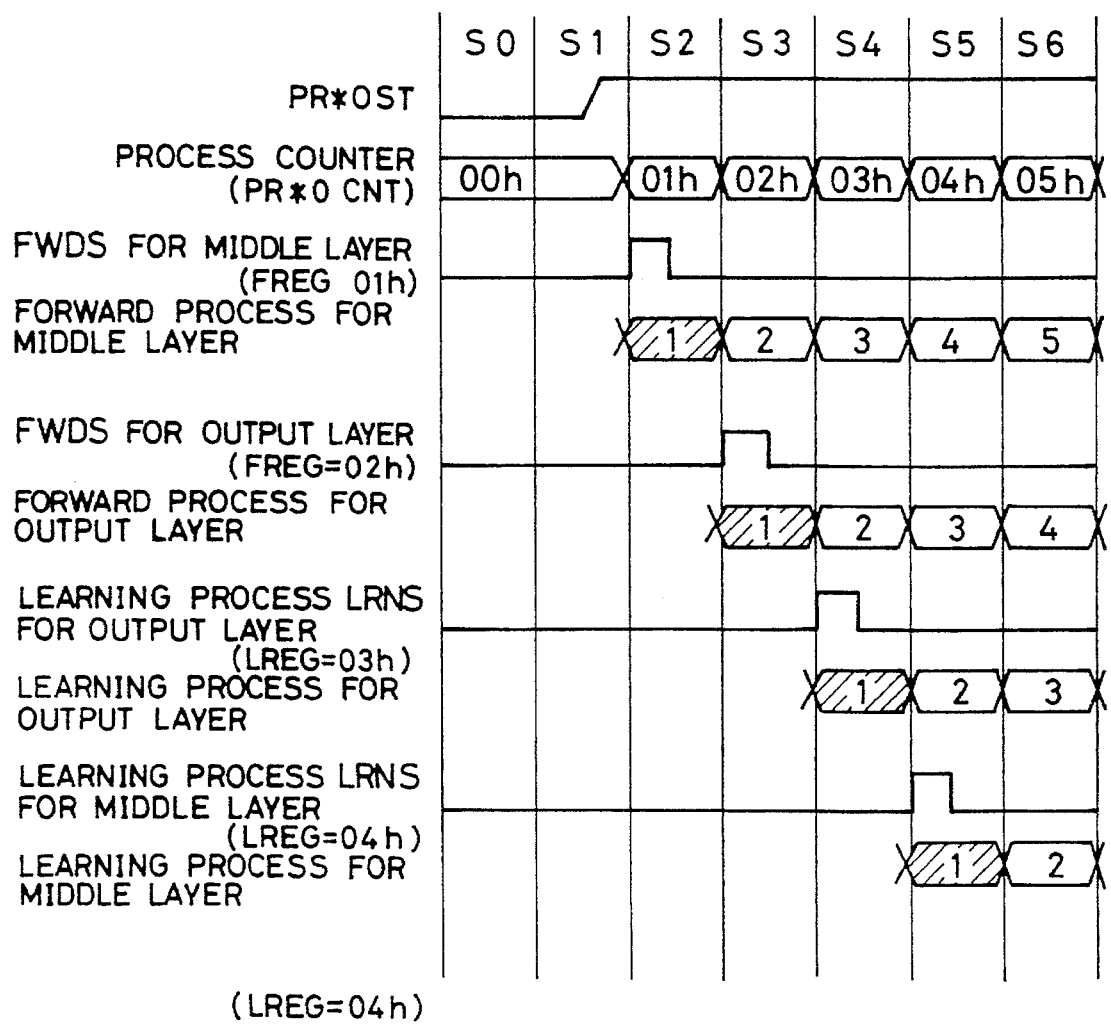
FIG. 31 is a timing chart showing how the embodiment operates.
Figure 32:
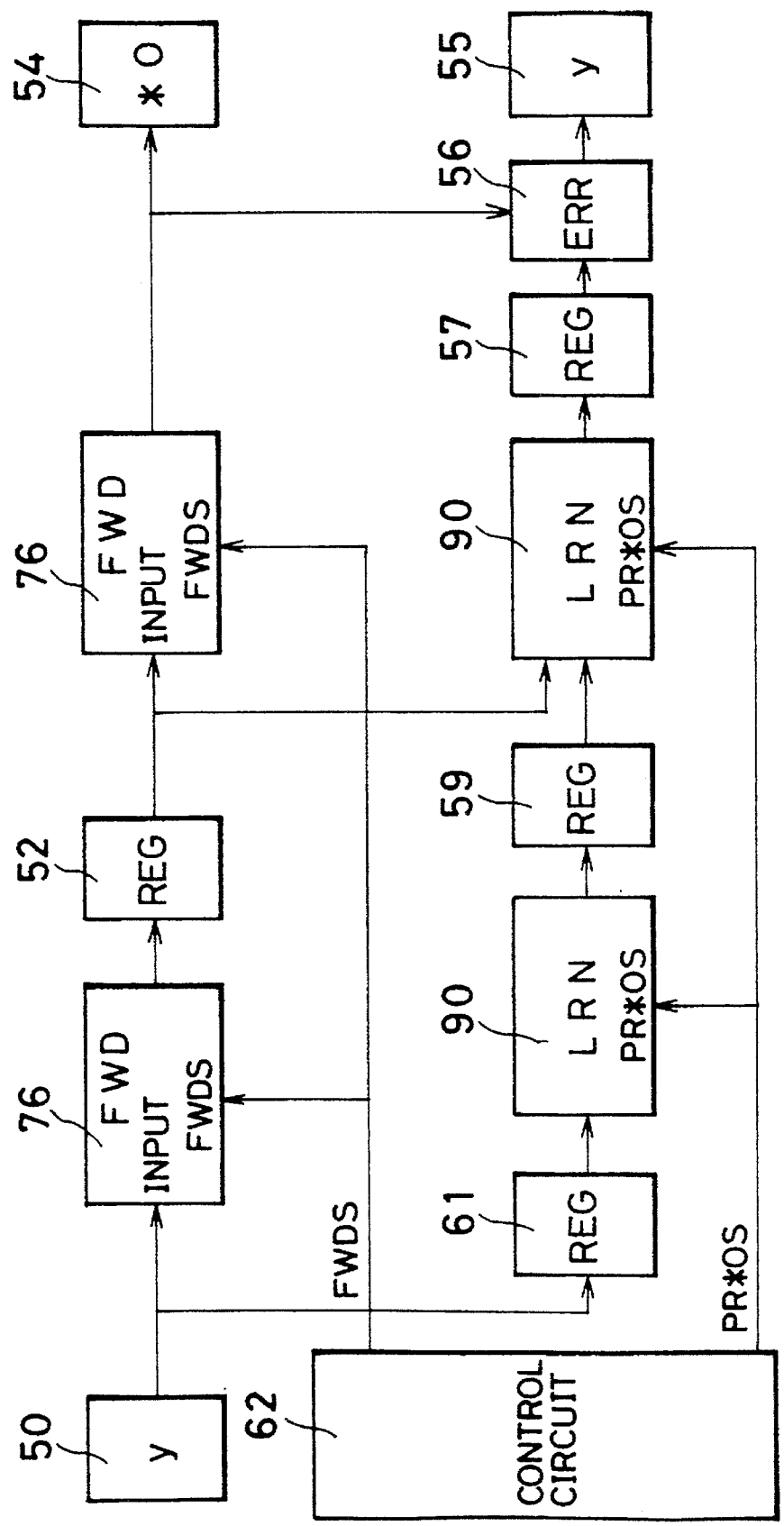
FIG. 32 is a block diagram showing a three-layered hierarchical network according to the embodiment.
Figure 33:
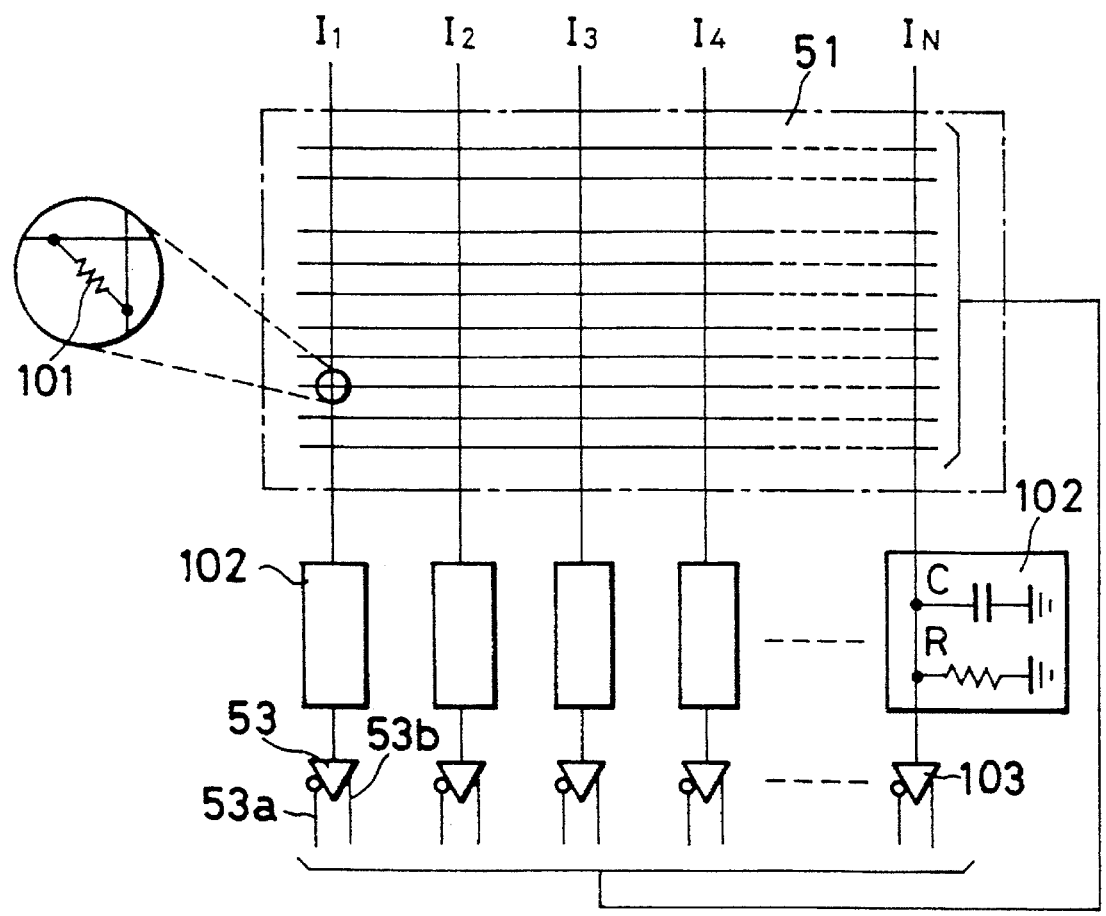
FIG. 33 is a circuit diagram showing a neural network implemented by an electric circuit.
Figure 34:
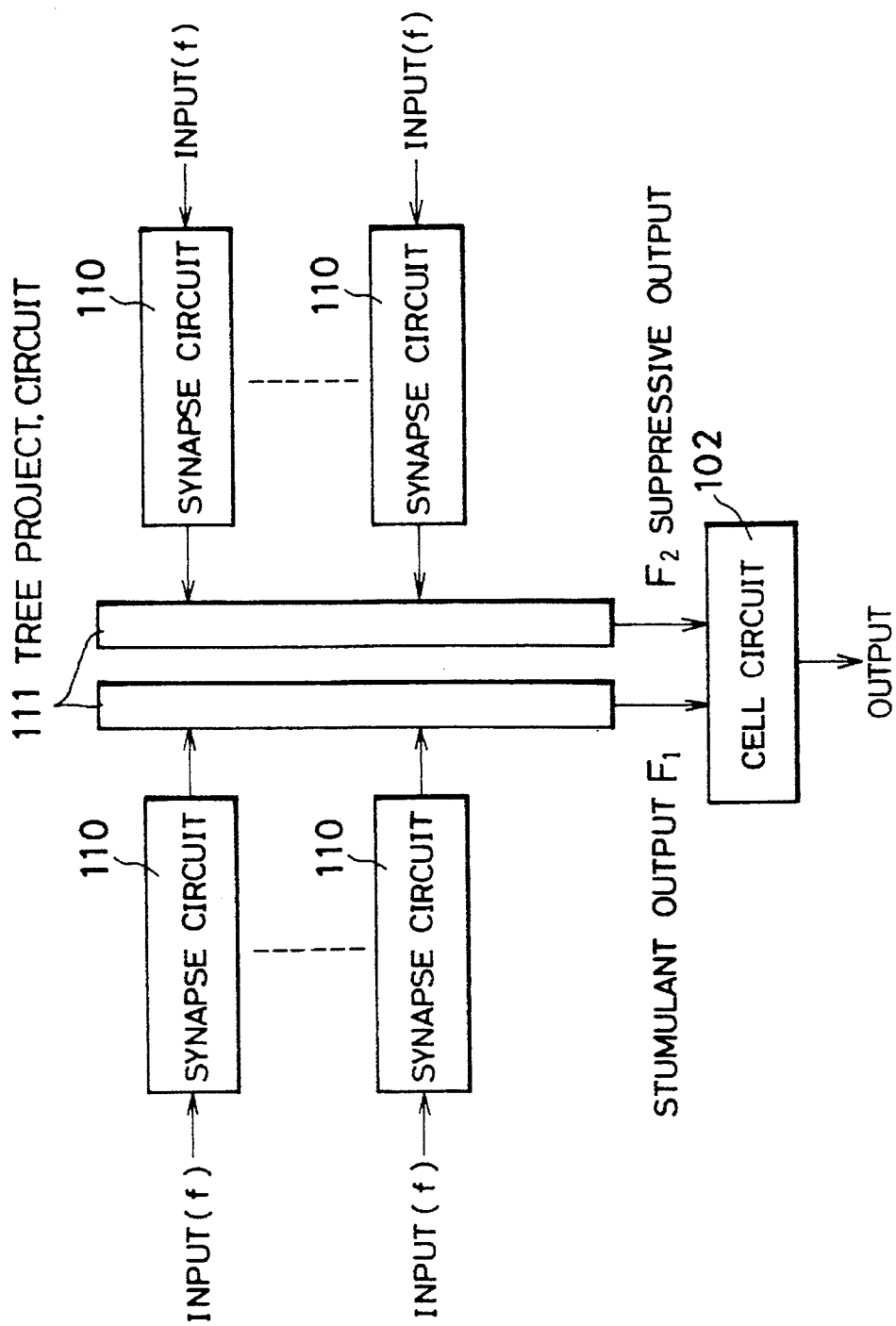
FIG. 34 is a block diagram showing a circuit arrangement of a single neuron cell.
Figure 35:
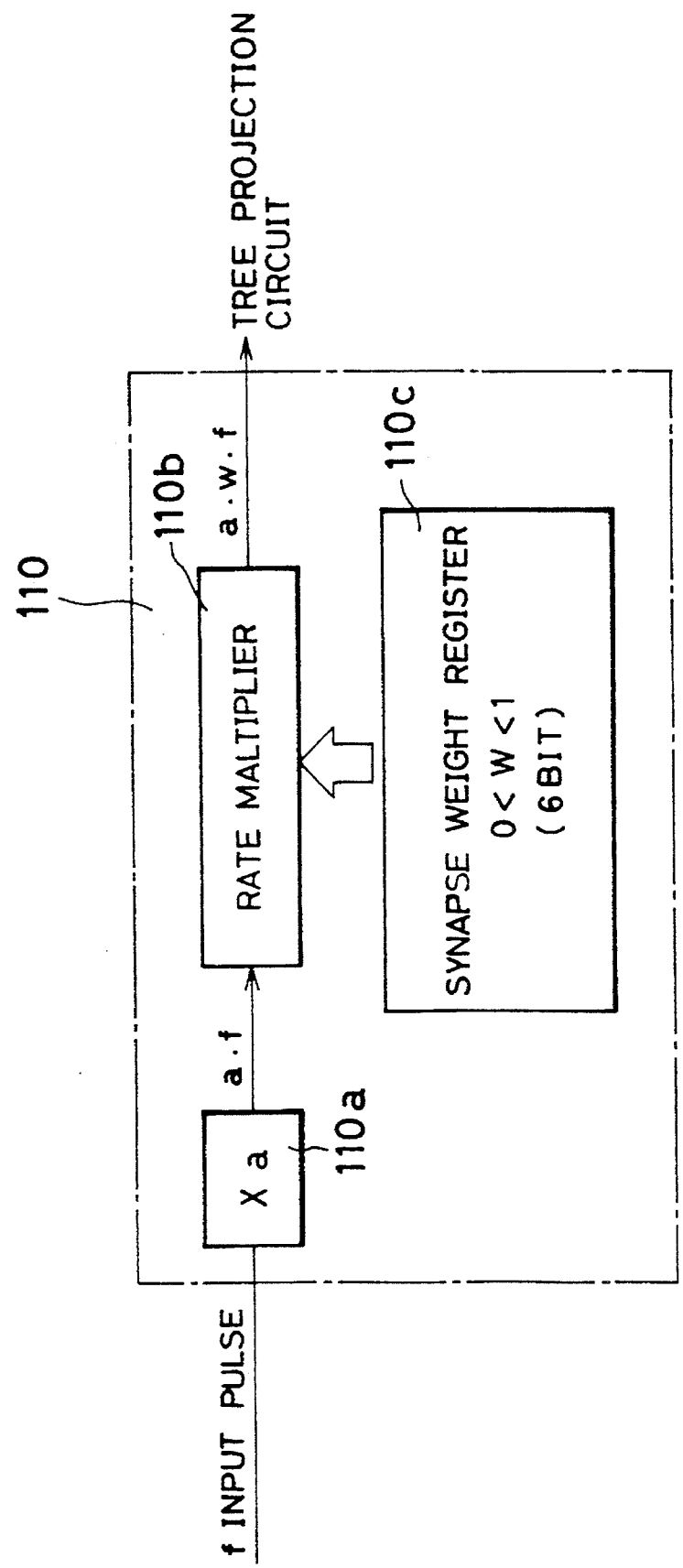
FIG. 35 is a block diagram showing a synapse circuit.
Figure 36:
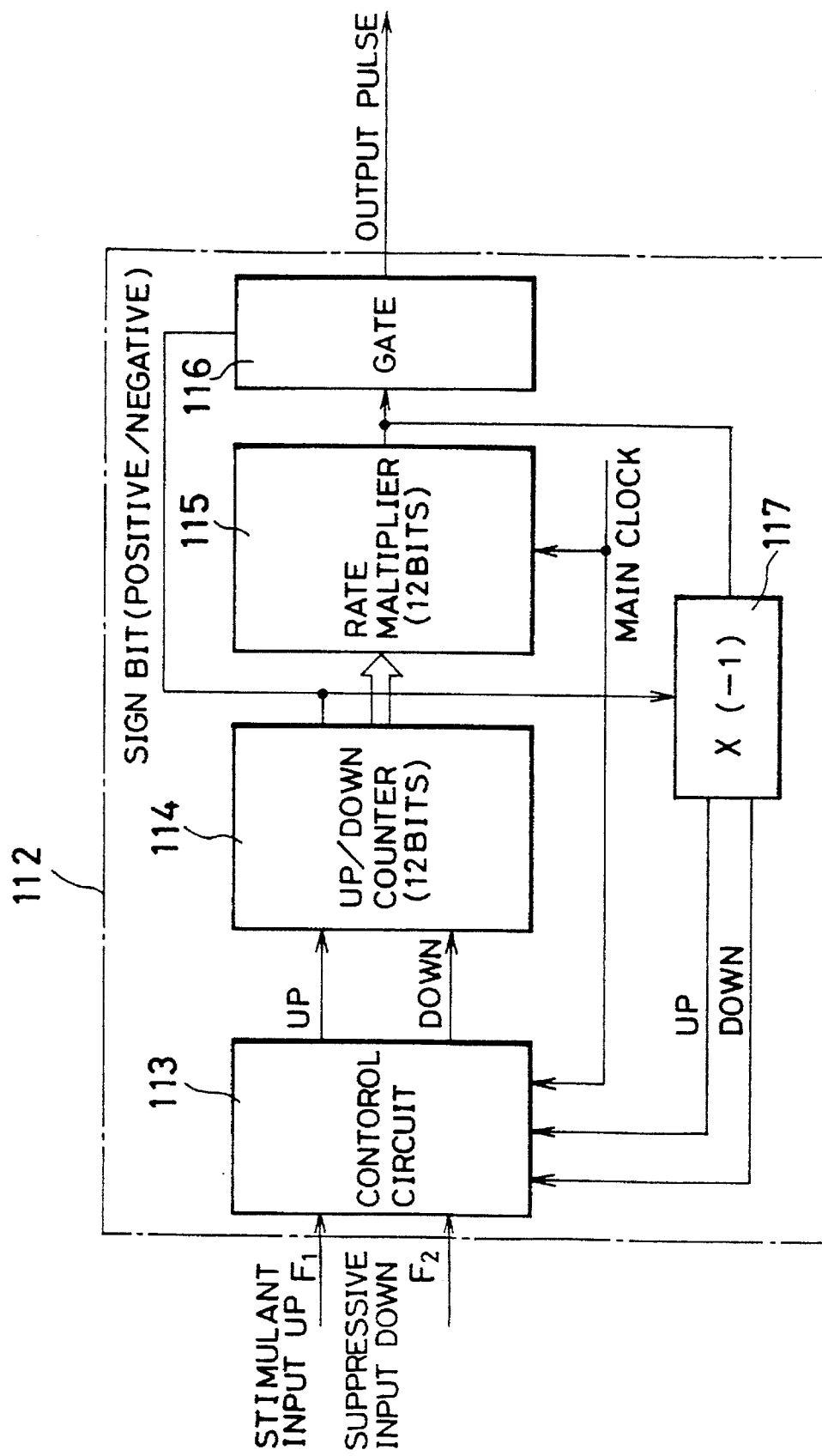
FIG. 36 is a block diagram showing a neuron cell.

The three-layered hierarchical network composed of the forward process circuit 86 and the learning process circuit 90 is just as shown in the block diagram of FIG. 32. This network operates on the timing shown in FIG. 31.

That is, at first, at states S0 and S1 before transferring to the forward process, 01h represented in 8-bit binary notation is stored in the FREG 82 for the middle layer. 02h is stored in the FREG 82 for the output layer. 03h is stored in the LREG 87 for the output layer. 04h is stored in the LREG 87 for the middle layer. In this state, a control circuit 91 operates to issue a process start signal PROST to the PRO CNT 82. In response to the signal PROST, the PRO CNT 82 is activated so that the forward process may be started. Then, at the state S1, the forward process for the middle layer is executed. At a state S2, the forward process for the output layer is executed. At a state S3, the learning process for the output layer is executed. At a state S4, the learning process for the middle layer is executed. As described above, all the process from the forward process for the middle layer to the learning process for the middle layer is executed in parallel.

According to the above-mentioned process, this three-layered hierarchical network may share the forward process start signal and the learning process start signal for the middle layer and the output layer. This network is more controllable than the prior art shown in FIG. 17. The multilayered network as shown in FIG. 7 may enjoy this advantage over the controllability if this embodiment may apply to the multilayered network.

Many widely different embodiments of the present invention may be constructed without departing from the spirit and scope of the present invention. It should be understood that the present invention is not limited to the specific embodiments described in the specification, expect as defined in the appended claims.

What is claimed is:

1. A signal processing apparatus using a hierarchical neural network composed of neuron model cells, comprising:

a plurality of counters corresponding to an input layer, a middle layer and an output layer, respectively, said plurality of counters having respective initial values; and means for setting said plurality of counters to said initial values before transferring to a forward process and for giving a common forward process execution signal commonly to all of said counters when executing said forward process, each of said plurality of counters for counting said common forward process execution signal given by said setting means and for generating a forward process execution signal, comprising a predetermined value corresponding to a respective layer, for executing said forward process of each said respective layer.

2. A signal process apparatus using a hierarchical neural network composed of neuron model cells, said hierarchical neural network having an input layer, a middle layer, and an output layer, comprising:

a plurality of counters corresponding to said input layer, middle layer and output layer, respectively;

a plurality of registers for storing starting states for starting forward processes, each of said plurality of registers respectively corresponding to one of said input, middle and output layers;

a plurality of comparators, each of said comparators corresponding to one of said input, middle and output layers, for comparing a value of one of said counters corresponding to said one of said input, middle and output layers with a value of one of said registers corresponding to said one of said input, middle and output layers; and means for activating each of said plurality of registers to store a starting state for starting a forward process of a corresponding layer before transferring to said forward process and giving a common forward process execution signal commonly to each layer when executing said forward process, wherein each of said plurality of counters counts in response to said common forward process execution signal, each of said plurality of comparators generates a forward process execution signal, corresponding to one of said input, middle and output layers, for ordering said one of said input, middle and output layers to execute said forward process when the value of one of said counters corresponding to said one of said input, middle and output layers is equal to or greater than the value of the register.

3. A signal processing apparatus using a hierarchical neural network composed of neuron model cells, comprising:

a plurality of counters corresponding to an input layer, a middle layer and an output layer, respectively, said plurality of counters having respective initial values; and means for setting said plurality of counters to said initial values before transferring to a learning process and for giving a common learning process execution signal commonly to all of said counters when executing said learning process, each of said plurality of counters for counting said learning process execution signal and for generating a learning process execution signal, comprising a predetermined value corresponding to a respective layer, for executing said learning process of said respective layer.

4. A signal processing apparatus using a hierarchical neural network composed of neuron model cells, comprising:

means for executing a learning process comprising counters for each of an input layer, a middle layer and an output layer, registers for storing a learning process start state, comparators for comparing a value of one of said counters with a value of the corresponding one of said registers, and means for activating said register in each layer for storing a starting state for starting the learning process of the layer and giving a common learning process execution signal commonly to each layer when executing the learning process, wherein each of said plurality of counters counts in response to said common learning process execution signal, and said comparator of each layer generates a learning process execution signal to be given if the value of said counter for one of said layers is equal to or greater than the value of said registers for one of said layers.

5. A signal processing apparatus using a hierarchical neural network composed of neuron model cells, comprising:

a plurality of process counters, corresponding to an input layer, a middle layer and an output layer respectively, for controlling a forward process and a learning process, a plurality of forward process registers for storing forward process start states, a plurality of forward process comparators for respectively comparing values of said registers with values of said process counters, a plurality of learning process registers for storing learning process start states of said input, middle and output layers, a plurality of learning process comparators for respectively comparing values of said learning process registers with values of said process counters, and means for activating each of said plurality of forward process registers for storing the forward process start state of a corresponding one of a said input, middle, and output layers to store a state for starting the learning process of each of said layers and giving a common process execution signal commonly to all of the layers when executing said process, wherein each of said plurality of process counters counts in response to said common learning process execution signal, each of said plurality of forward process comparators generates a forward process execution signal, corresponding to one of said input, middle and output layers, for starting the forward process when the value of the process counter corresponding to said one layer is equal to or greater than the register for storing a forward process start state corresponding to said one layer, and said learning process register generates a learning process execution signal, corresponding to one of said input, middle and output layers, for starting the learning process when the value of the process counter corresponding to said one layer is equal to or greater than the value of the register for storing the learning process start state corresponding to said one layer.

* * * * *